United States Patent
Washio et al.

(10) Patent No.: US 6,208,346 B1
(45) Date of Patent: *Mar. 27, 2001

(54) ATTRIBUTE INFORMATION PRESENTING APPARATUS AND MULTIMEDIA SYSTEM

(75) Inventors: Nobuyuki Washio; Shinta Kimura; Yasuo Sato; Eiichiro Yamamoto; Chikako Matsumoto, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,346

(22) Filed: Jan. 13, 1997

(30) Foreign Application Priority Data

Sep. 18, 1996 (JP) .................................................. 8-246642

(51) Int. Cl.⁷ ..................................................... G06T 15/00
(52) U.S. Cl. ............................................ 345/419; 345/302
(58) Field of Search .................................... 345/419, 302

(56) References Cited

U.S. PATENT DOCUMENTS

| | | | | |
|---|---|---|---|---|
| 5,223,828 | * | 6/1993 | McKiel, Jr. ...................... | 340/825.19 |
| 5,371,854 | * | 12/1994 | Kramer ................................. | 395/2.79 |
| 5,633,993 | * | 5/1997 | Redmann et al. ..................... | 345/419 |
| 5,642,171 | * | 6/1997 | Baumgartner et al. .............. | 348/515 |
| 5,682,166 | * | 10/1997 | Takahashi ............................. | 345/119 |
| 5,771,041 | * | 6/1998 | Small .................................... | 345/326 |
| 5,777,612 | * | 7/1998 | Kataoka ................................ | 345/302 |
| 5,864,343 | * | 1/1999 | Naughton et al. .................... | 345/419 |

OTHER PUBLICATIONS

Nikkei Electronics, No. 661; May 6, 1996 (pp. 127–138).

* cited by examiner

Primary Examiner—Jeffery Brier
Assistant Examiner—Motilewa Good-Johnson
(74) Attorney, Agent, or Firm—Staas & Halsey LLP

(57) ABSTRACT

A system having a relative coordinate input unit for inputting relative coordinates of an object to a viewer point, a data storage unit for storing plural pieces of data of attribute information (audio information, video information, etc.) of the object according to plural sets of relative coordinates corresponding to the viewer point, and a data preparing unit for reading out and delivering the data of attribute information on the object corresponding to the relative coordinates according to the inputted relative coordinates, in which the attribute information given by the object to the viewer point corresponding to the relative position of the object to the viewer point is presented in real time if the object moves very fast. The data preparing unit, when receiving the relative coordinates of the object to the viewer point from the relative coordinate input unit, converts the inputted relative coordinates into an address showing a region in which the data of the corresponding attribute information is stored, delivers the address to the data storage unit, and reads out the data of desired attribute information according to the input relative coordinates.

26 Claims, 32 Drawing Sheets

FIG. 26
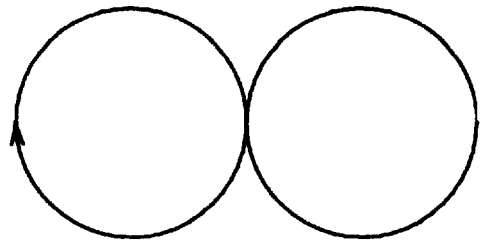
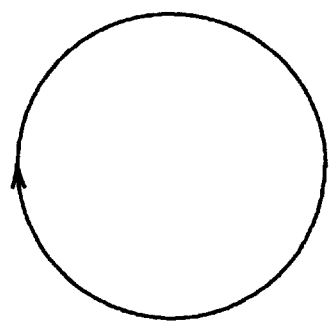
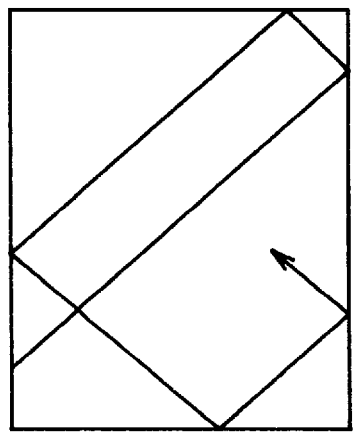
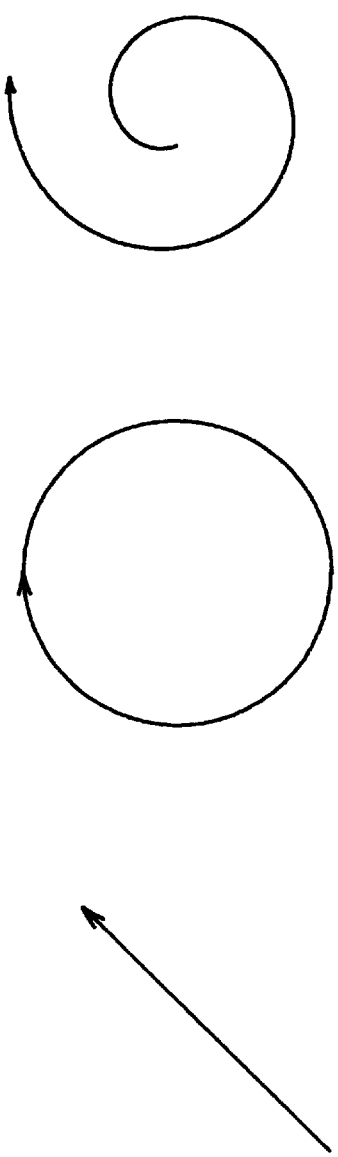
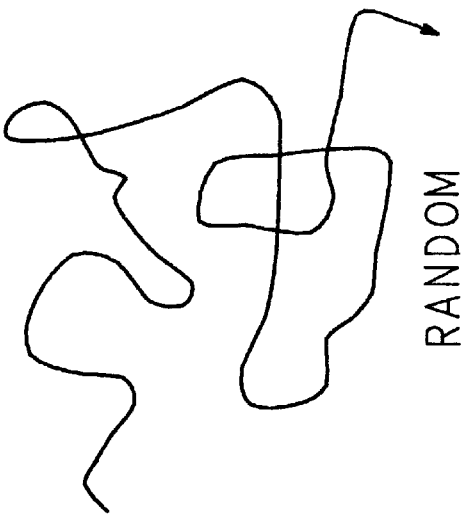

ATTRIBUTE INFORMATION PRESENTING APPARATUS AND MULTIMEDIA SYSTEM

BACKGROUND OF THE INVENTION

The present invention relates to an attribute information presenting apparatus for presenting attribute information such as sound information and picture information to be indicated to a reference point by an object according to the relative position of the object to the reference point.

The technology for realizing the function of stereo enhancement effect for enhancing the spreading sensation of stereo sound only by two speakers connected to a personal computer has been developed. This stereo enhancement effect is an acoustic effect of amplifying the spreading sensation of stereo sound in the horizontal direction, and by varying the frequency characteristic and phase of sound signal, the sound is heard from outside of the installed positions of the right and left speakers, and the depth sensation of sound is also increased.

This stereo enhancement effect is one of the acoustic effects created by the function known as three-dimensional sound. The three-dimensional sound is a function for realizing a solid acoustic effect by using two speakers, and by using only two speakers installed at specified positions, the sound is heard from the vertical, lateral and front-rear directions of the listener, that is, from all directions of the three-dimensional space surrounding the listener.

The three-dimensional sound possesses, in addition to the above acoustic effect of stereo enhancement effect, an acoustic effect of reproducing reflected sound and reverberation of a concert hall (sound field control), and an acoustic effect of moving a specific sound source freely so that the sound should be heard from an arbitrary direction of the listener (sound image localization). These acoustic effects are realized by varying the frequency characteristics and phase of the sound signal from two speakers in consideration of changes of frequency characteristic from the sound source until the sound actually reaches the ears of the listener.

Therefore, if the relative positions of the sound generating and moving object and the listener (viewer point) are different, sound signals having frequency characteristic and phase suited to the relative positions must be emitted from two speakers. In this case, hitherto, relative coordinates of the object to the viewer point are inputted, and audio data corresponding to the relative coordinates are created from the model audio data by using a filter circuit and others.

Besides, the technology for creating picture information such as object shape, color and texture, aside from the sound information, according to the relative position of the object to the viewer point has been also developed. In this case, same as in the case of sound, image data depending on the relative coordinates is created from the model image data.

FIG. 1 is a diagram showing the principle of a conventional attribute information presenting apparatus. The prior art has a relative coordinate input unit 101 for entering relative coordinates (r, θ, φ) of the object to the viewpoint expressed in polar coordinates, a model storage unit 102 for storing the model of various attribute information including object shape, color, texture, and sound, and a data creating unit 103 for creating data of desired attribute information on the basis of each model in the model storage unit 102 according to the relative coordinates inputted from the relative coordinate input unit 101. When relative coordinates of the object to the viewer point are inputted in the data creating unit 103 through the relative coordinate input unit 101, the model data of the object is read out from the model storage unit 102. In the data creating unit 103, the data of the attribute information at the point when the model data reaches the viewer point is created and delivered on the basis of the model data.

In this prior art, the processing quantity in the data creating unit 103 is huge when creating data of attribute information according to the relative coordinates inputted from the relative coordinate input unit 101. Therefore, for creating and processing in real time, a high speed system is indispensable, which results in a high cost. Or, if the object moves very fast, even by using a high speed system, the creating and processing speed cannot follow up the changes of relative coordinates, and data of attribute information cannot be created in real time.

Also in the prior art, while the object and/or viewer point is moving, it is necessary to re-calculate the relative coordinates of the object to the viewpoint point all the time and input from the relative coordinate input unit 101, and it demands tremendous labor in input of relative coordinates.

BRIEF SUMMARY OF THE INVENTION

It is hence a primary object of the invention to present an attribute information presenting apparatus capable of obtaining data of attribute information in real time, without requiring high speed processing system, by storing data of preliminarily created attribute information.

It is another object of the invention to present an attribute information presenting apparatus capable of creating data of attribute information in real time even if the object moves very fast.

It is a further object of the invention to present an attribute information presenting apparatus simplified in input of relative coordinates by calculating the transitional time series of relative coordinates of an object to a viewer point on the basis of a relative motion command inputted from outside.

The above and further objects and features of the invention will more fully be apparent from the following detailed description of the accompanying drawings.

BRIEF DESCRIPTION OF THE SEVERAL VIEWS OF THE DRAWINGS

FIG. 22 is a block diagram showing the principle of a second aspect;
FIG. 26 is a diagram showing patterns of plural relative motions.

DETAILED DESCRIPTION OF THE INVENTION

Figure 1:
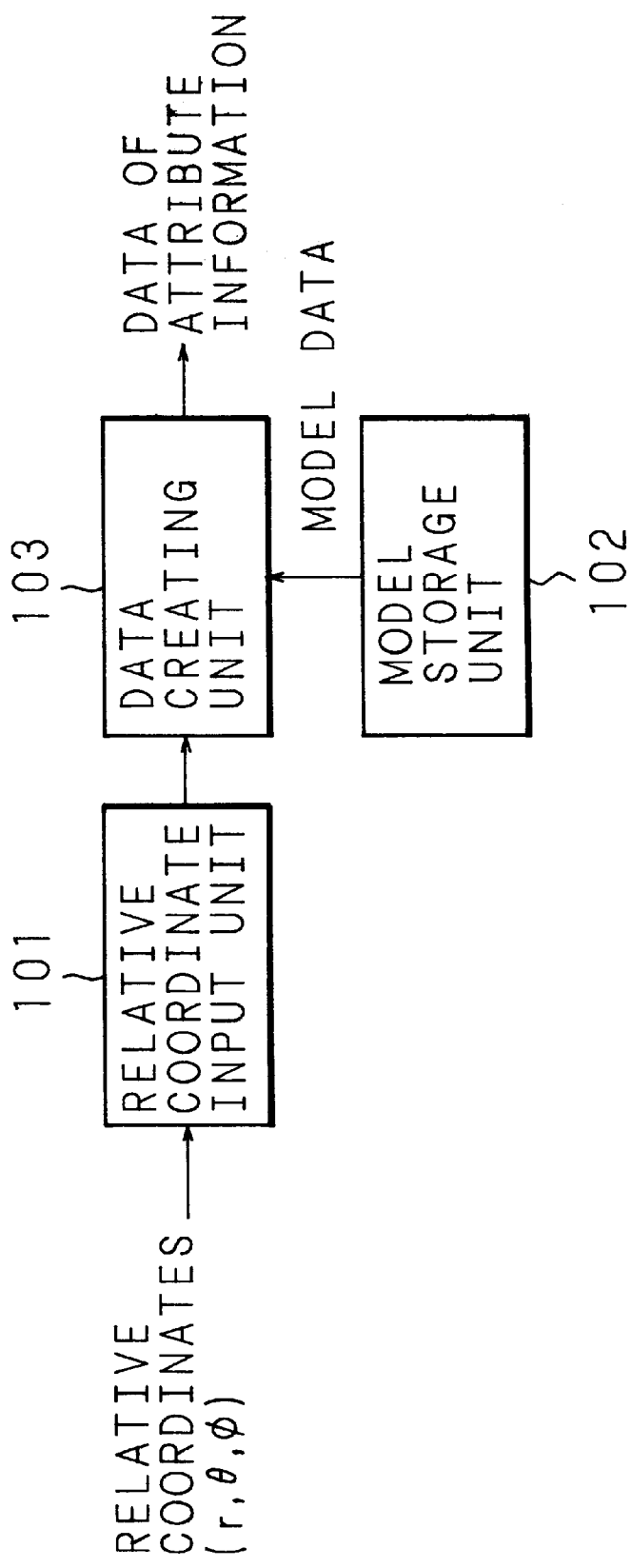
FIG. 1 is a block diagram of a prior art.
Figure 2:
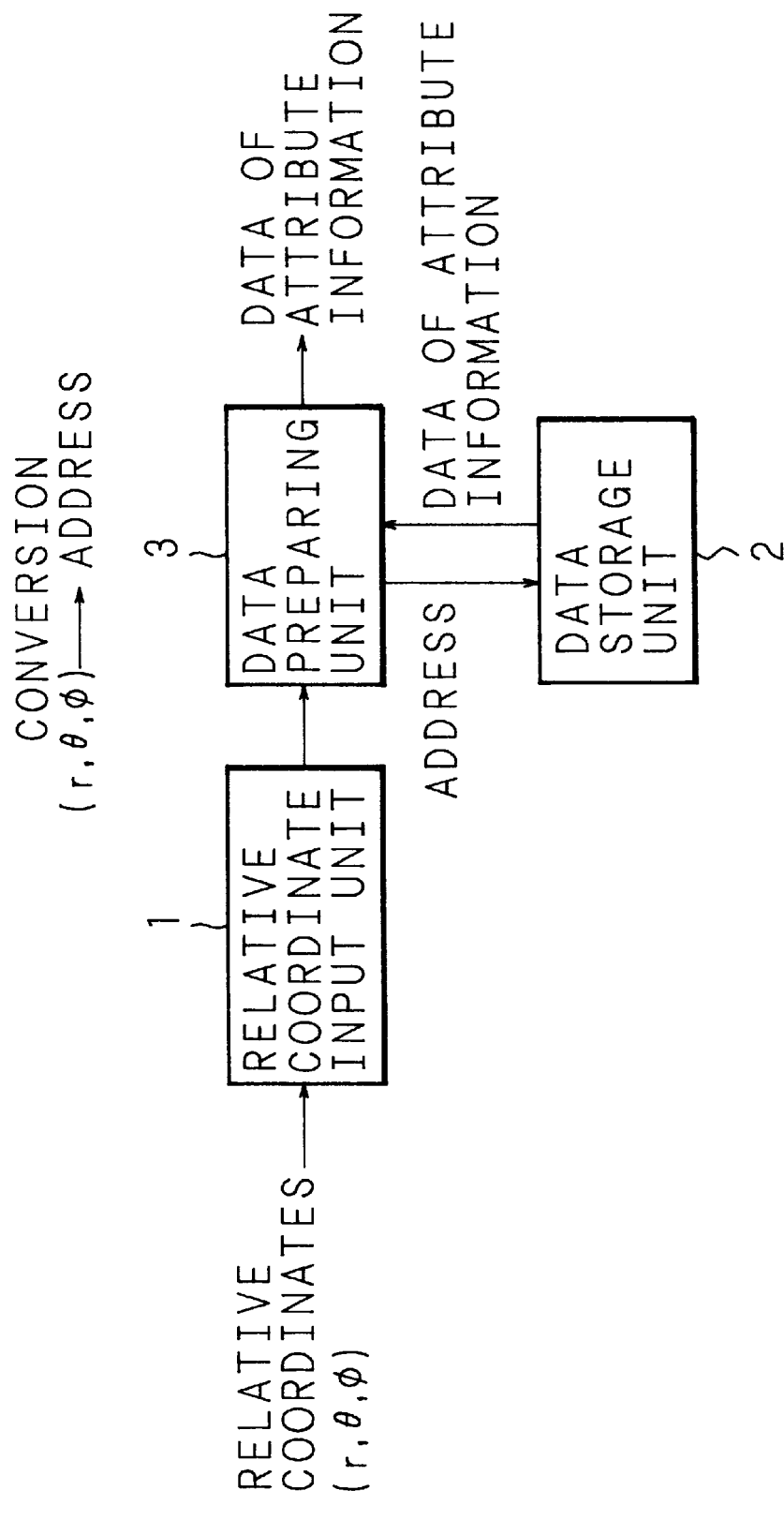
FIG. 2 is a block diagram showing the principle of a first aspect.

FIG. 2 is a block diagram showing the principle of a first aspect. The attribute information presenting apparatus of the first aspect has a relative coordinate input unit 1 for inputting relative coordinates of an object to a reference point, a data storage unit 2 for storing data of plural pieces of attribute information on the object according to plural sets of relative coordinates to the reference point, and a data preparing unit 3 for reading out and delivering data of attribute information on the object corresponding to the relative coordinates from the data storage unit 2 according to the relative coordinates inputted from the relative coordinate input unit 1. When relative coordinates of the object to the reference point are inputted from the relative coordinate input unit 1, the data preparing unit 3 converts the input relative coordinates to an address showing a region in which the data of the corresponding attribute information is stored, and delivers the address to the data storage unit 2, and reads out the data of the desired attribute information according to the input relative coordinates.

Figure 3:
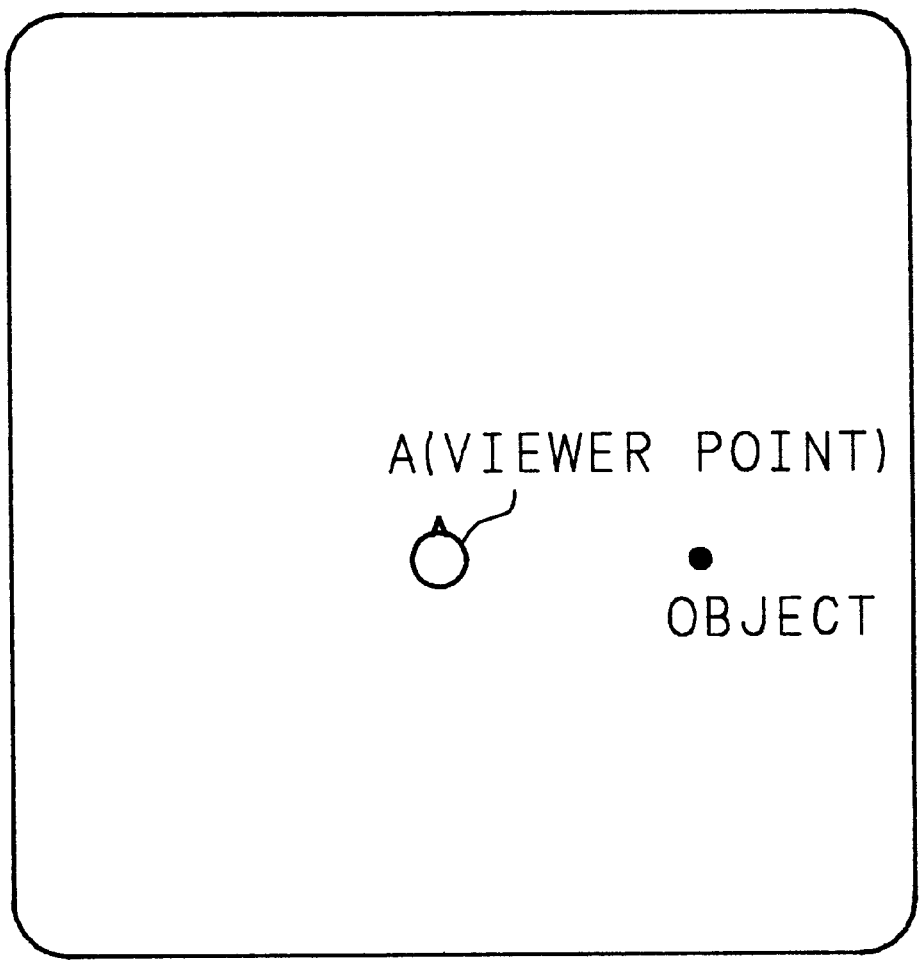
FIG. 3 is a diagram for explaining the operating principle of the first aspect (a diagram showing the configuration of a viewer point and an object)
Figure 4:
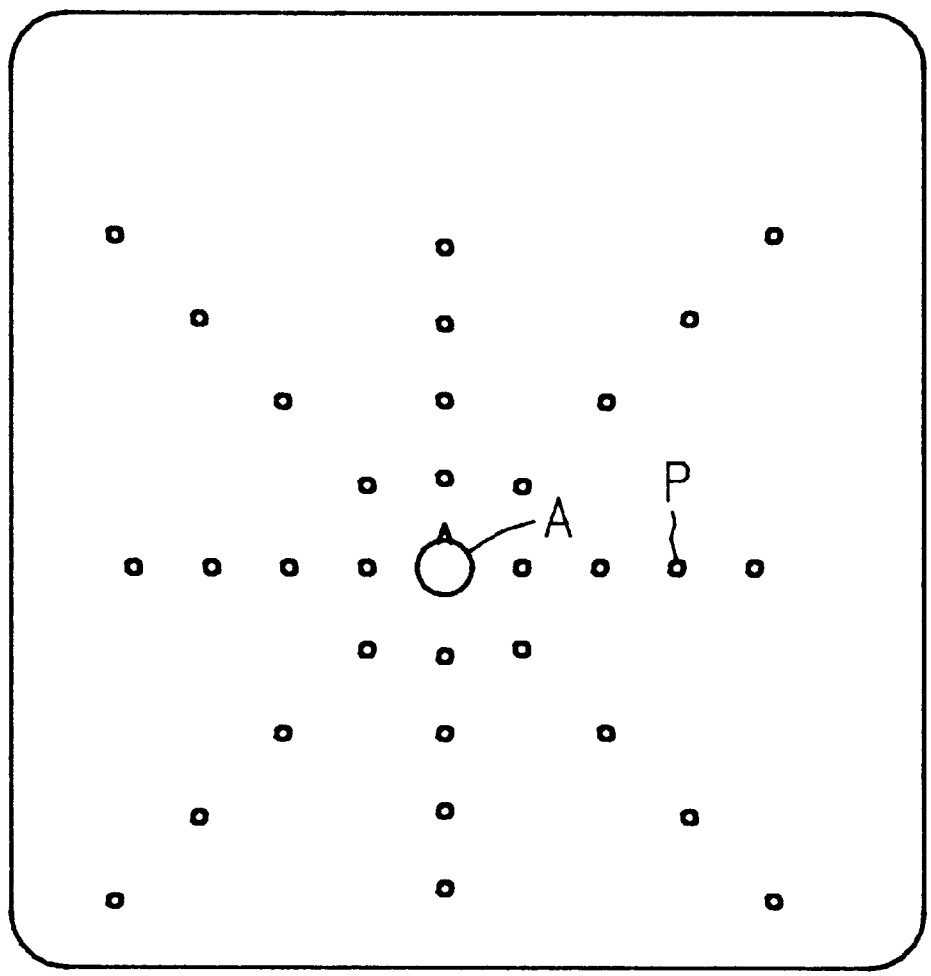
FIG. 4 is a diagram for explaining the operating principle of the first aspect (a diagram showing relative coordinates in which audio data is stored)

FIGS. 3 and 4 are diagrams for explaining the operating principle of the first aspect. In the following description, the reference point is the viewer point, data of attribute information on the object is audio data, and the object and viewer point are supposed to be present in the virtual space of a personal computer. In FIG. 3, A in the virtual space of the personal computer denotes the viewer point, and the bullet mark represents the position of the object moving in the virtual space. In the example shown in FIG. 3, the object is present on the right side of the viewer point A, and the sound is delivered from two speakers of the personal computer to be heard from the direction as if the object is actually present at that position.

In the first aspect, when the object is present at a specific position to the viewer point, the data of the sound to be delivered from the two speakers is determined preliminarily, and the audio data is stored in the data storage unit 2. FIG. 4 shows the position of the object in which such audio data is stored, and its arbitrary position can be specified by the relative coordinates to the viewer point A. When the object is present at the position of a circle mark in FIG. 4, the audio data corresponding to the relative coordinates is stored in the corresponding address region of the data storage unit 2.

Hence, for example, when the object is present at the position shown in FIG. 3, since the audio data at the relative coordinates is stored (P in FIG. 4), as the relative coordinates are inputted in the data preparing unit 3 through 5 the relative coordinate input unit 1, the address corresponding to the relative coordinates is delivered to the data storage unit 2, and desired audio data is read out from the data storage unit 2 into the data preparing unit 3.

Thus, according to the first aspect, unlike the prior art, instead of processing to create data (audio data) of attribute information according to the relative coordinates every time relative coordinates are inputted, data (audio data) of attribute information corresponding to various relative coordinates are determined preliminarily, and the data (audio data) of determined attribute information is stored, and therefore the processing quantity upon input of relative coordinates is substantially reduced as compared with the prior art. Hence, if using a system which is not high in speed, the data (audio data) of attribute information can be created in real time. Even if the object moves very fast, it is possible to cope with in real time.

Embodiments of the first aspect (first to fifteenth embodiments) are specifically described below. In the following embodiments, data of attribute information on the object is explained as three-dimensional audio data.

(First embodiment)

Figure 5:
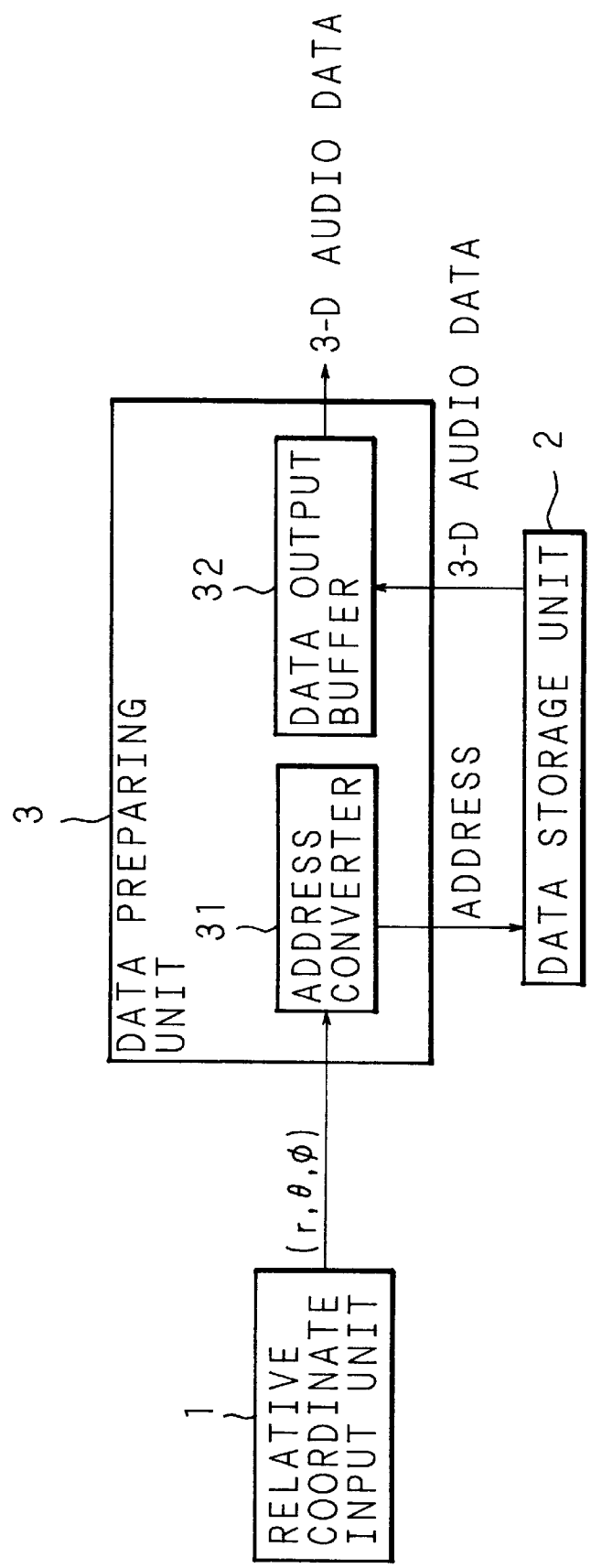
FIG. 5 is a block diagram of a first embodiment.

FIG. 5 is a block diagram of a first embodiment. The attribute information presenting apparatus of the first embodiment comprises a relative coordinate input unit 1 for inputting relative coordinates (r, θ, φ), a data storage unit 2 for storing data of plural pieces of three-dimensional audio data of an object according to plural sets of relative coordinates to a viewer point, and a data preparing unit 3 for reading out and delivering data of three-dimensional sound of the object corresponding to the relative coordinates according to the relative coordinates inputted from the relative coordinate input unit 1. The data preparing unit 3 includes an address converter 31 and a data output buffer 32.

The relative coordinate input unit 1 receives relative coordinates (r, θ, φ) of the object to the viewer point, and sends them to the address converter 31 in the data preparing unit 3. The address converter 31 converts the inputted relative coordinates into an address showing a region in the data storage unit 2 in which the corresponding three-dimensional audio data is stored, and delivers the address to the data storage unit 2. The three-dimensional audio data stored in the address region is read out from the data storage unit 2, and is once taken into the data output buffer 32. The taken three-dimensional audio data is buffered and delivered.

(Second embodiment)

In the attribute information presenting apparatus of a second embodiment, relative coordinates are sequentially inputted into the relative coordinate input unit 1, and data (audio data) of attribute information corresponding to the relative coordinates is read out from the data storage unit 2. Therefore, transitional and continuous data (audio data) of attribute information can be obtained.

Figure 6:
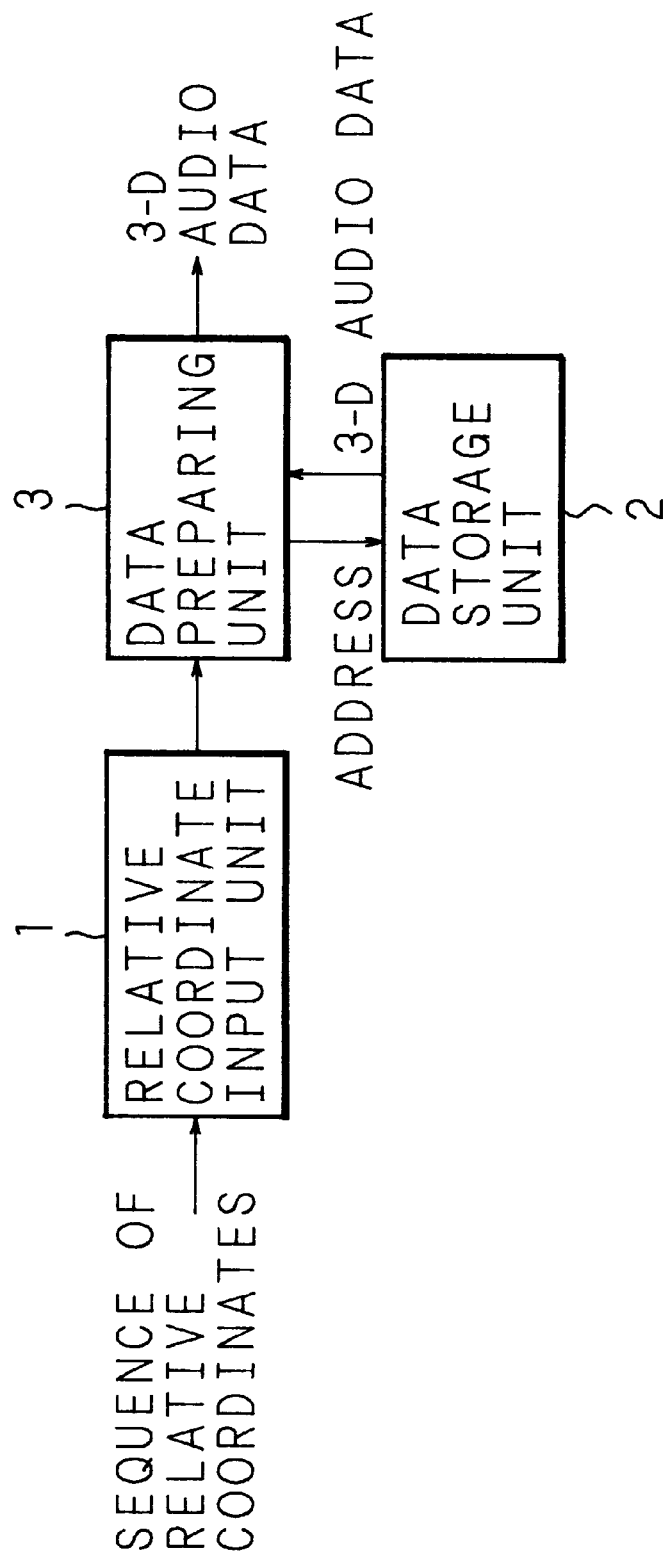
FIG. 6 is a block diagram of a second embodiment.

FIG. 6 is a block diagram of the second embodiment. In FIG. 6, the same parts as in FIG. 5 are identified with the same reference numerals and explanations are omitted. The internal structure of the data preparing unit 3 is same as in FIG. 5. The data preparing unit 3 converts the relative coordinates (relative coordinate sequence) successively inputted from the relative coordinate input unit 1 sequentially into addresses, and reads out corresponding three-dimensional audio data from the data storage unit 2, and delivers the read three-dimensional audio data (three-dimensional audio data sequence) sequentially.

(Third embodiment)

Figure 7:
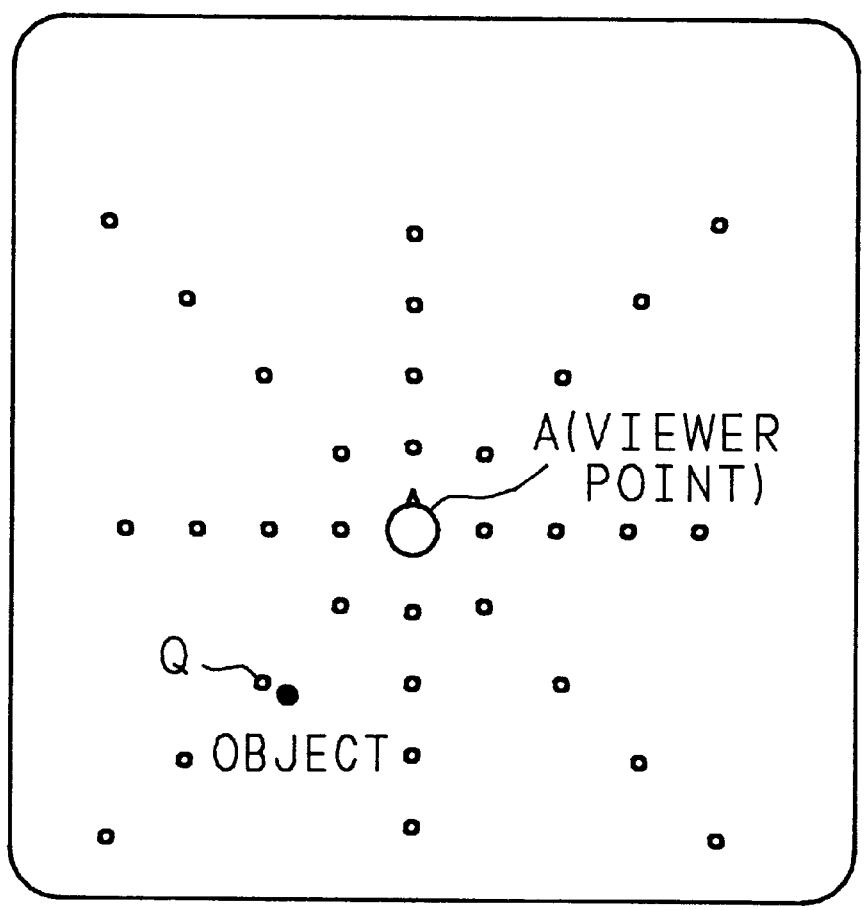
FIG. 7 is a diagram for explaining the operating principle of the first aspect (a diagram showing an example of relationship between the object existing position and relative coordinates in which audio data is stored)

In the attribute information presenting apparatus of a third embodiment, if data (audio data) of attribute information on the object at the relative coordinates inputted in the relative coordinate input unit 1 is not stored in the data storage unit 2, data (audio data) of attribute information at the relative coordinates which are closest to the input relative coordinates and in which data (audio data) of attribute information is stored is used as substitute for the data (audio data) of attribute information at the input relative coordinates. For example, when the object is present at a position as shown in FIG. 7, the audio data at the relative coordinates is not stored in the data storage unit 2. In such a case, used as a substitute is the audio data corresponding to the relative coordinates (Q in FIG. 7) which are closest to the relative coordinates and in which the audio data is determined preliminarily.

Figure 8:
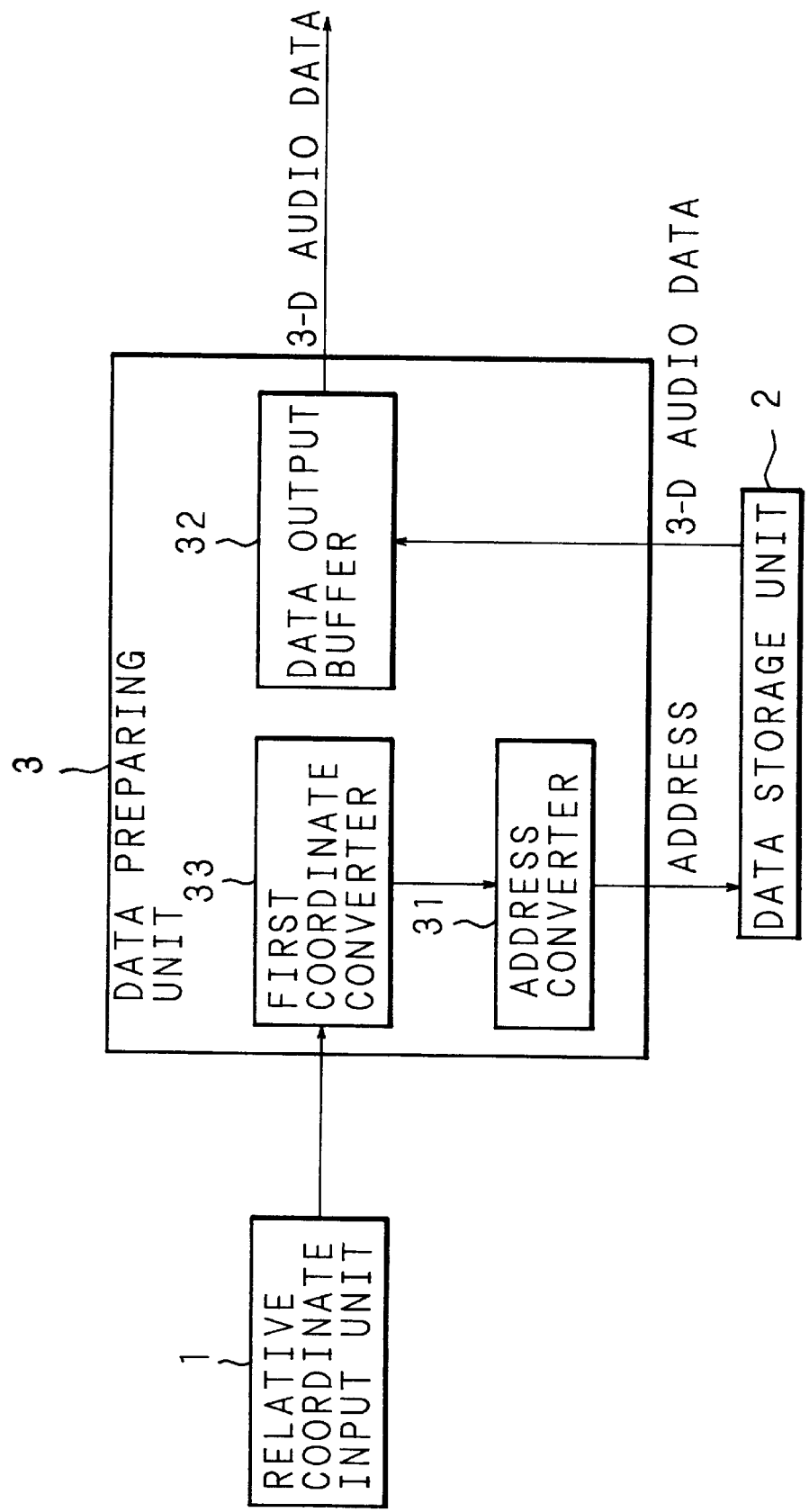
FIG. 8 is a block diagram of a third embodiment.

FIG. 8 is a block diagram of the third embodiment. The constitution is the same as in FIG. 5 except for the data preparing unit 3. Herein, the relative coordinates (circle mark in FIG. 4) of which corresponding three-dimensional audio data is stored in the data storage unit 2 are defined as data presence relative coordinates. The data preparing unit 3 includes a first coordinate converter 33 for converting the relative coordinates of which corresponding three-dimensional audio data is not stored in the data storage unit 2 into data presence relative coordinates, an address converter 31 for converting the data presence relative coordinates into an address showing a region in the data storage unit 2 in which the corresponding three-dimensional audio data is stored, and a data output buffer 32 same as in FIG. 5.

When the relative coordinates inputted from the relative coordinate input unit 1 are data presence relative coordinates, in the data preparing unit 3, the relative coordinates (data presence relative coordinates) directly pass through the first coordinate converter 33, and are converted into a corresponding address in the address converter 31. On the other hand, when the input relative coordinates are not data presence relative coordinates, in the data preparing unit 3, the input relative coordinates are converted into data presence relative coordinates positioned most closely to the input relative coordinates in the first coordinate converter 33, and the converted data presence relative coordinates are converted into a corresponding address in the address converter 31. Thus obtained address is put out into the data storage unit 2, and the three-dimensional audio data stored in that address region is read into the data output buffer 32, and is buffered and delivered.

(Fourth embodiment)

Figure 9:
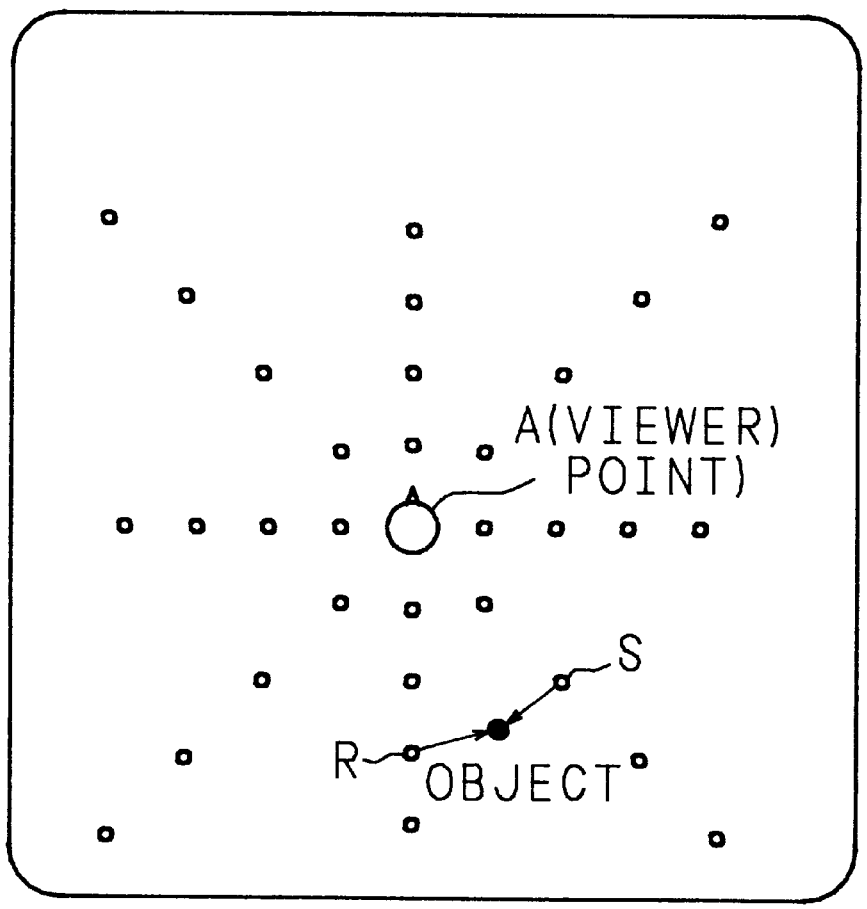
FIG. 9 is a diagram for explaining the operating principle of the first aspect (a diagram showing another example of relationship between the object existing position and relative coordinates in which audio data is stored)

In the attribute information presenting apparatus of a fourth embodiment, if data (audio data) of attribute information on the object at the relative coordinates inputted in the relative coordinate input unit 1 is not stored in the data storage unit 2, data (audio data) of plural pieces of attribute information at plural sets of relative coordinates near the inputted relative coordinates in which data (audio data) of attribute information is stored is interpolated, and the interpolated data is used as the data (audio data) of attribute information at the entered relative coordinates. When the object is present at the position as shown in FIG. 9, the audio data at the relative coordinates is not stored in the data storage unit 2. In such a case, interpolating the audio data near the relative coordinates and corresponding to plural sets of relative coordinates in which audio data is determined preliminarily (for example, R, S in FIG. 9), the audio data at this time is calculated virtually.

Figure 10:
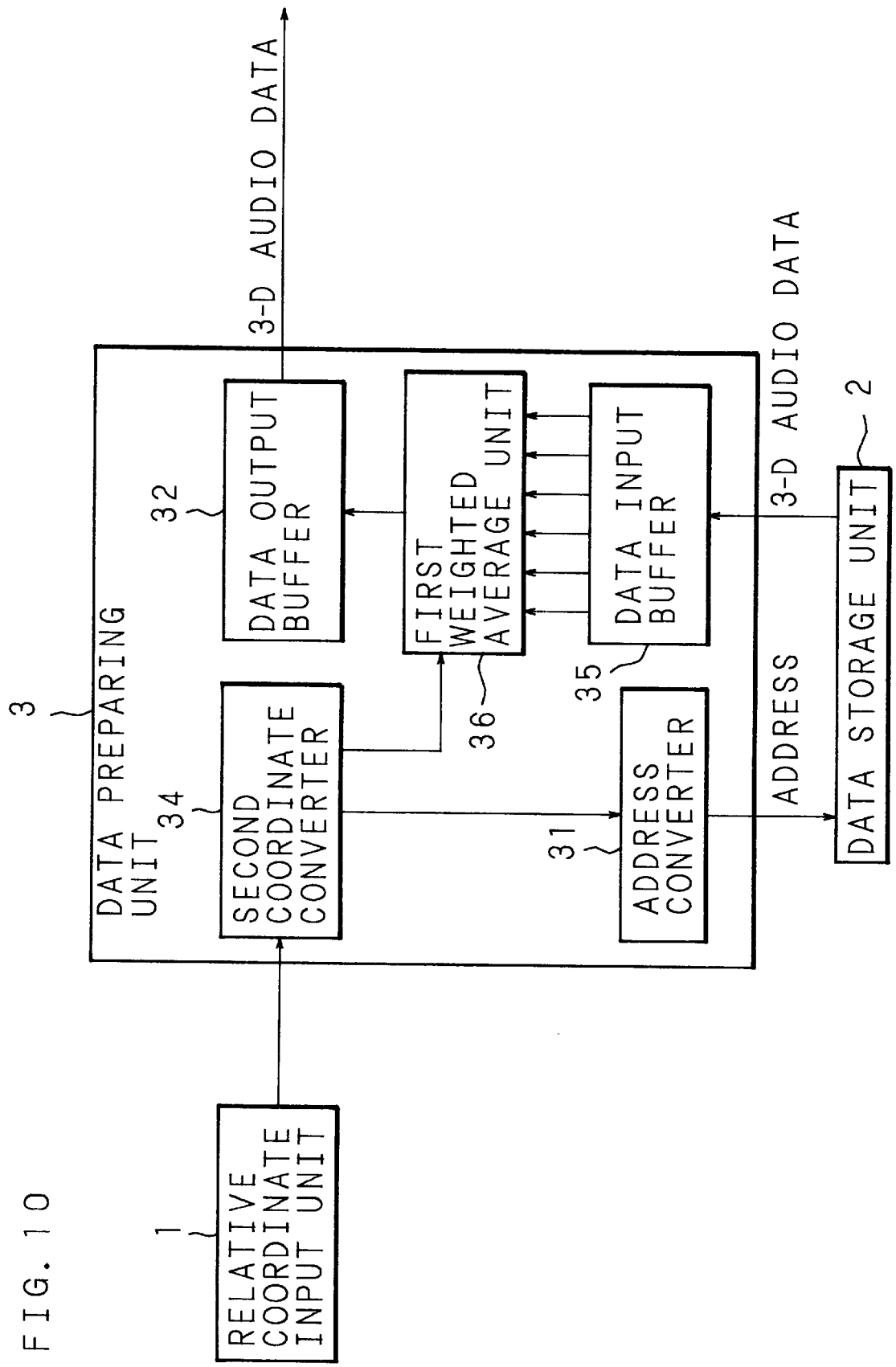
FIG. 10 is a block diagram of a fourth embodiment.

FIG. 10 is a block diagram of the fourth embodiment. The constitution except for the data preparing unit 3 is the same as that in FIG. 5. The data preparing unit 3 includes a second coordinate converter 34 for converting relative coordinates of which corresponding three-dimensional audio data is not stored in the data storage unit 2 into plural sets of data presence relative coordinates close to them, an address converter 31 for converting plural sets of data presence relative coordinates into an address showing a region in the data storage unit 2 in which the corresponding three-dimensional audio data is stored, a data input buffer 35 for taking in the three-dimensional audio data read out from the data memory unit 2, a first weighted average unit 36 for weighting and averaging (interpolating) the stored data in the data input buffer 35 according to the input relative coordinates and plural sets of data presence relative coordinates and calculating one piece of three-dimensional audio data, and a data output buffer 32 same as in FIG. 5.

When the relative coordinates inputted from the relative coordinate input unit 1 are not data presence relative coordinates, first in the second coordinate converter 34 of the data preparing unit 3, the input relative coordinates are successively converted into plural sets of data presence relative coordinates existing in the vicinity. The plural converted sets of data presence relative coordinates are successively delivered into the address converter 31 and first weighted average unit 36. Each set of data presence relative coordinates is converted into a corresponding address in the address converter 31, and each address is delivered to the data storage unit 2, and plural pieces of three-dimensional audio data stored in the address region are successively read into the data input buffer 35. In the first weighted average unit 36, according to the configuration of the input relative coordinates and plural sets of data presence relative coordinates, the data in the data input buffer 35 is weighted and averaged, and the weighted average data is delivered to the data output buffer 32.

For example, in the data storage unit 2, suppose three-dimensional audio data corresponding to the relative coordinates (r, θ, φ) [r: a positive integral, θ: a ten-degree unit from −180 degrees to 180 degrees, and φ: a ten-degree unit from −90 degrees to 90 degrees] are stored. Herein, in the input relative coordinates are (3, 15, 0), the input relative coordinates converted into two sets of data presence relative coordinates (3, 10, 0), (3, 20, 0) in the second coordinate converter 34. These two sets of data presence relative coordinates are successively converted into addresses in the address converter 31, and the corresponding three-dimensional audio data are read out from the data storage unit 2, and stored into the data input buffer 35. In the first weighted average unit 36, since (3, 15, 0) is intermediate between (3, 10, 0) and (3, 20, 0), two pieces of three-dimensional audio data in the data input buffer 35 are reduced to 50% of amplitude each and mixed and written into the data output buffer 32. Thus, the three-dimensional audio data corresponding to the input relative coordinates (3, 15, 0) is virtually created and delivered.

(Fifth embodiment)

In the attribute information presenting apparatus of a fifth embodiment, according to the relative coordinate inputted successively, data (audio data) of plural pieces of attribute information continuous in time among data (audio data) of attribute information successively created in the data preparing unit 3 are connected smoothly by weighting and averaging in the time direction. Hence, the relation of the input timing of relative coordinates and output timing of data (audio data) of attribute information can be set freely.

Figure 11:
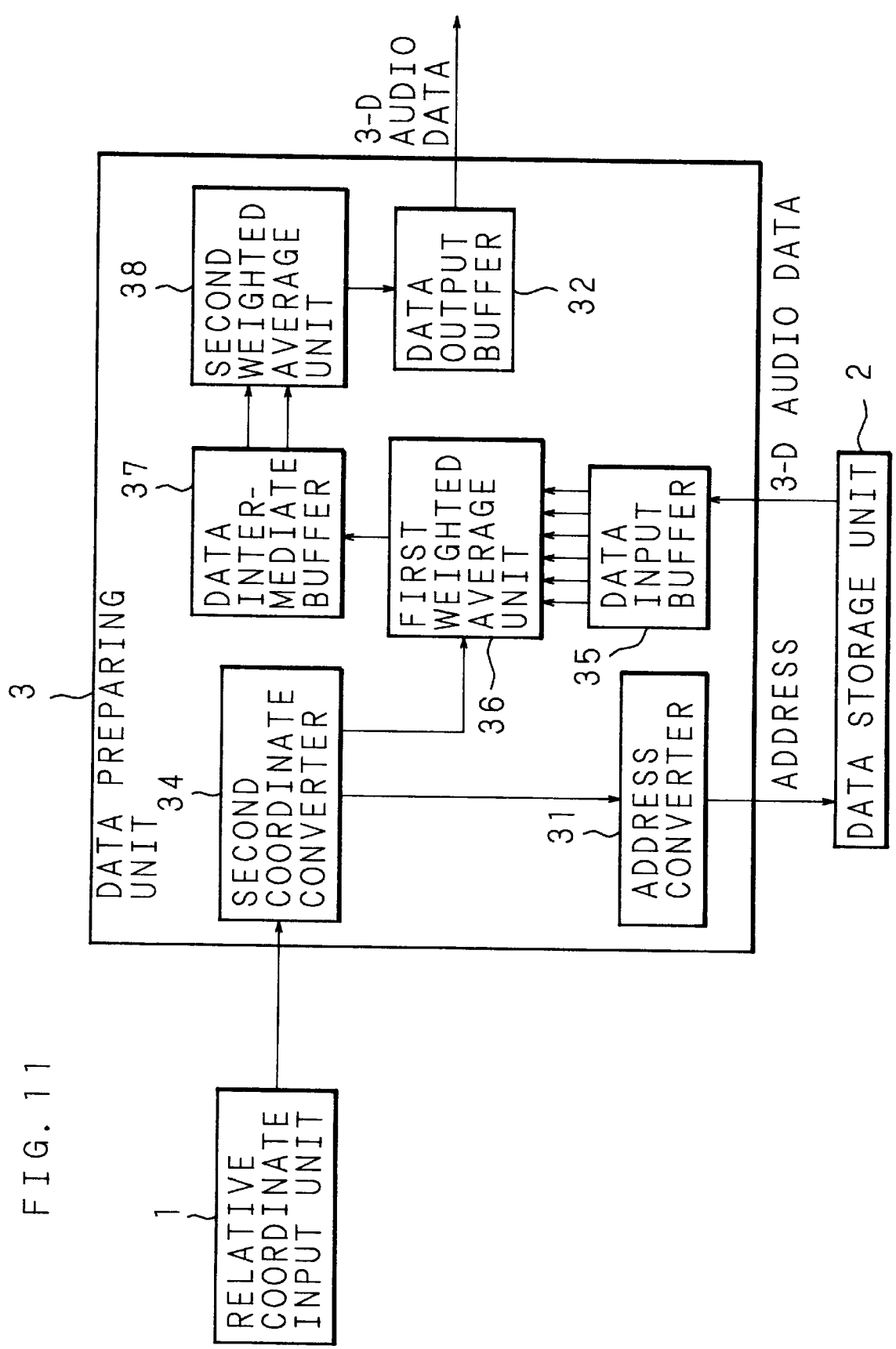
FIG. 11 is a block diagram of a fifth embodiment.

FIG. 11 is a block diagram of the fifth embodiment. The constitution except for the data preparing unit 3 is the same as that in FIG. 5. The data preparing unit 3 includes, the same as in FIG. 10, second coordinate converter 34, address converter 31, data input buffer 35, first weighted average unit 36, and data output buffer 32, and also a data intermediate buffer 37 for storing the latest output of the first weighted average unit 36 and the preceding output, and a second weighted average unit 38 for weighting and averaging (interpolating) the stored data in the data intermediate buffer 37 depending on the input period of relative coordinates and the output period of three-dimensional output data and calculating one piece of three-dimensional audio data.

The operation of the fifth embodiment is described below. In the following example, supposing that the relative coordinates are inputted in every 1/10 second from the relative coordinate input unit 1 and that the three-dimensional audio data is delivered in every 1/20 second from the data output buffer 32, the output from the first weighted average unit 36 is realized by time interpolation. The operation from the second coordinate converter 34 to the first weighted average unit 36 is the same as that in the fourth embodiment, and its explanation is omitted.

The latest output and the preceding output of the first weighted average unit 36 are buffered in the data intermediate buffer 37. In the second weighted average unit 38, when the latest data in the data intermediate buffer 37 is updated, the latest data and the preceding data are mixed at 50% of amplitude, and the mixed data is written into the data output buffer 32, and the latest data is written as it is directly into the data output buffer 32. Then, the same process is repeated after the latest data in the data intermediate buffer 37 is updated.

(Sixth embodiment)

In the attribute information presenting apparatus of a sixth embodiment, plural sets of relative coordinates continuous in time among the relative coordinates inputted successively are connected smoothly by weighting and averaging in the time direction. Hence, the relation between the input timing of the relative ordinates and output timing of data (audio data) of attribute information can be set freely.

Figure 12:
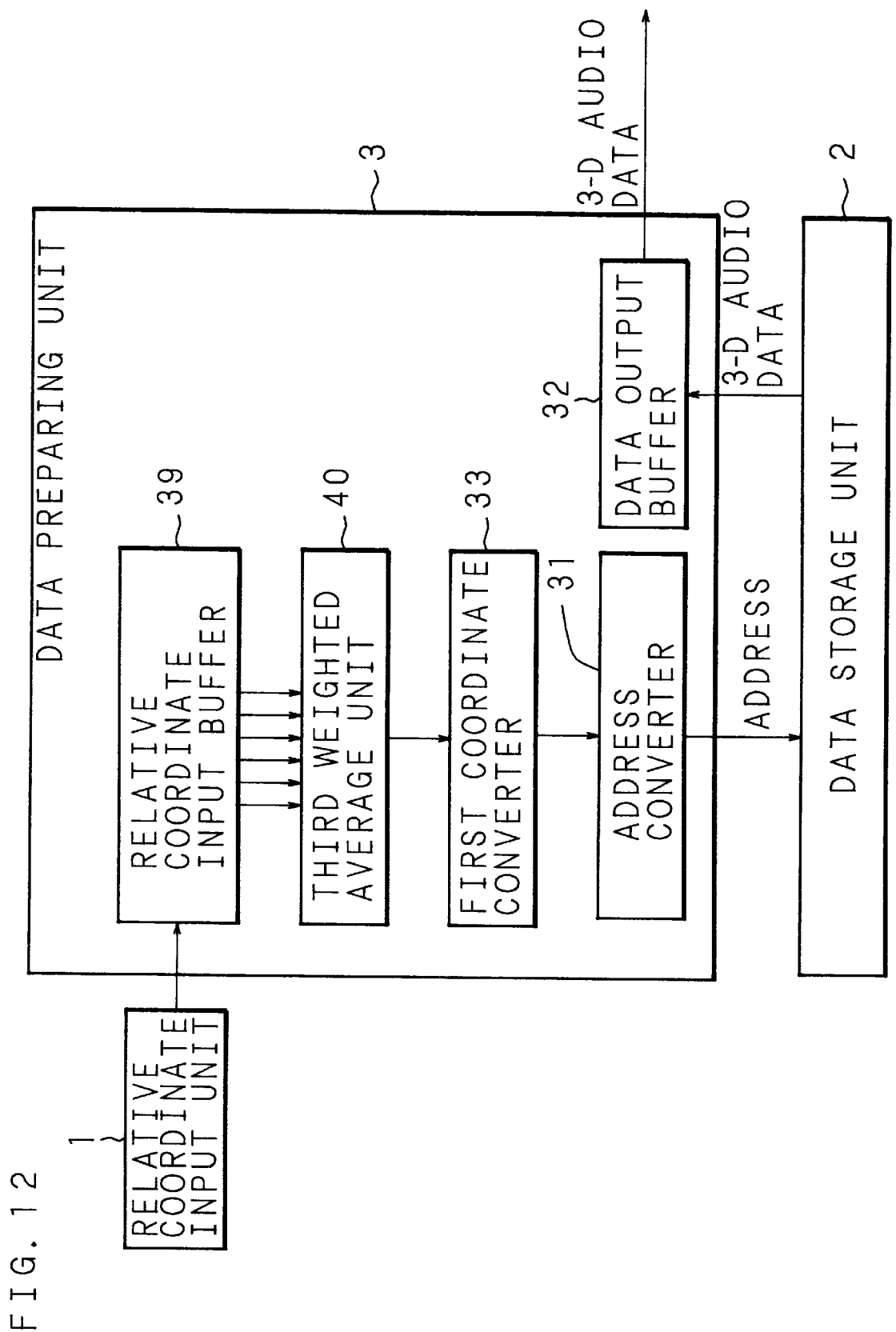
FIG. 12 is a block diagram of a sixth embodiment.

FIG. 12 is a block diagram of the sixth embodiment. The constitution except for the data preparing unit 3 is the same as that in FIG. 5. The data preparing unit 3 includes a relative coordinate input buffer 39 for buffering the relative coordinates inputted from the relative coordinate input unit 1, a third weighted average unit 40 for weighting and averaging (interpolating) stored relative coordinates of the relative coordinate input buffer 39 according to the input period of relative coordinates and output period of three-dimensional audio data and calculating one set of relative coordinates, and first coordinate converter 33, address converter 31, and data output buffer 32 same as in FIG. 8.

The operation of the sixth embodiment is described below by referring to an example in which relative coordinates are inputted in every 1/10 second from the relative coordinate input unit 1 and three-dimensional audio data is delivered in very 1/20 second from the data output buffer 32. The relative coordinates inputted from the relative coordinate input unit 1 are buffered by the relative coordinate input buffer 39. In the relative coordinate input buffer 39, the latest input relative coordinates and the preceding input relative coordinates are stored. In the third weighted average unit 40, when the latest input relative coordinates in the relative coordinate input buffer 39 are updated, the intermediate coordinates of the latest input relative coordinates and the preceding input relative coordinates are calculated and delivered, and then the latest input relative coordinates are delivered. Afterwards, after the latest input relative coordinates in the relative coordinate input unit 1 are updated, the same process is repeated. The operation after the first coordinate converter 33 is the same as the operation in the third embodiment, and the description is omitted.

(Seventh embodiment)

In the attribute information presenting apparatus of a seventh embodiment, on the basis of the absolute coordinates of the reference point (viewer point) inputted from outside, the sight direction, and the absolute coordinates of the object, the relative coordinates of the object to the reference point (viewer point) are determined, and the determined relative coordinates are noticed to the data preparing unit 3. Hence, also from the numerical values of the system of absolute coordinates, data (audio data) of attribute information can be prepared.

Figure 13:
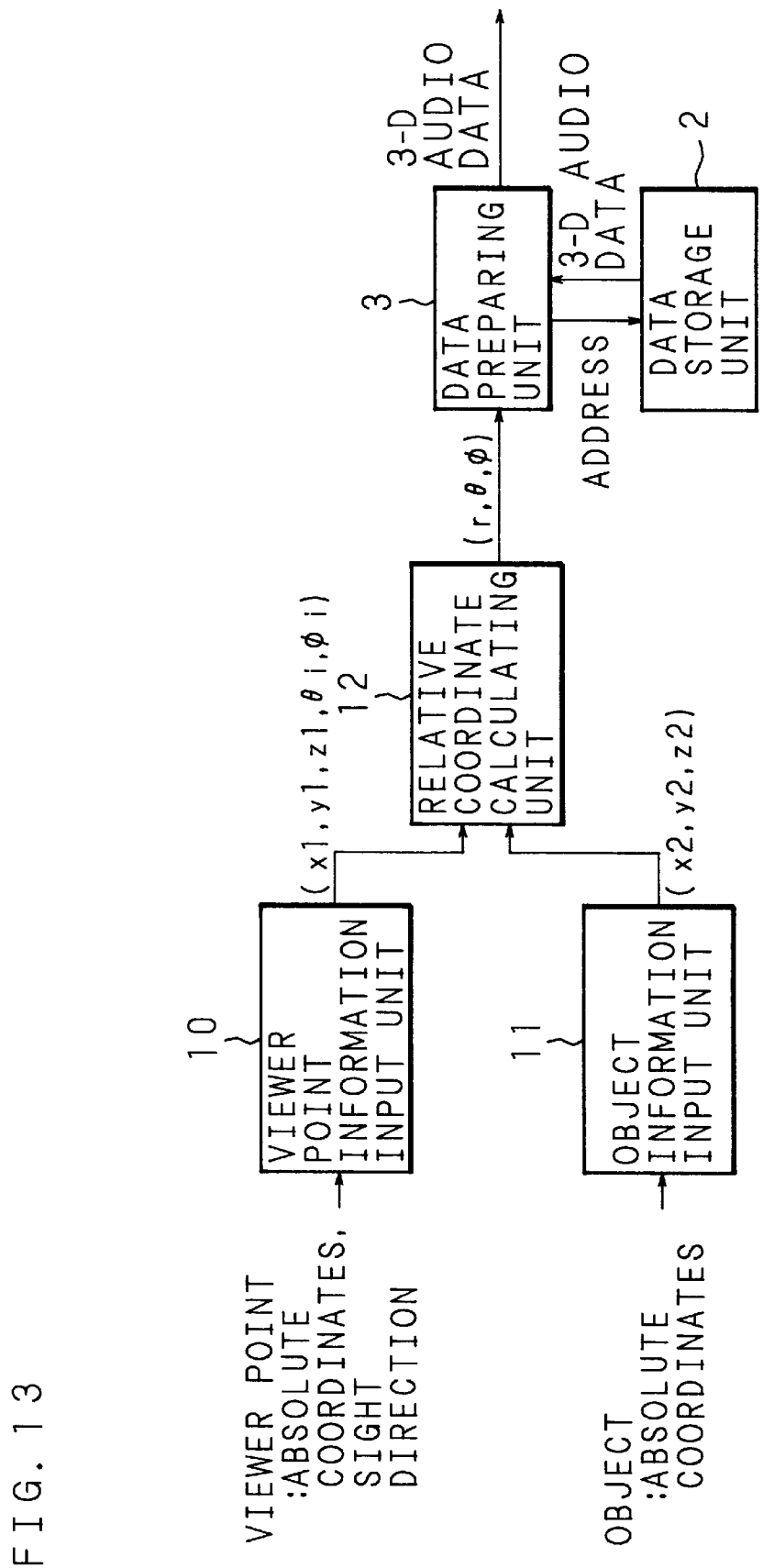
FIG. 13 is a block diagram of a seventh embodiment.

The attribute information presenting apparatus of the seventh embodiment of which constitution is shown in FIG. 13 has a viewer point information input unit 10 for receiving absolute coordinates (x1, y1, z1) and sight direction (θi, φi) of a viewer point, an object information input unit 11 for receiving absolute coordinates (x2, y2, z2) of the object, a relative coordinate calculating unit 12 for calculating relative coordinates (r, θ, φ) of the object to the viewer point on the basis of the inputs from the viewer point information input unit 10 and object information input unit 11, and data preparing unit 3 and data storage unit 2 same as in FIG. 5.

The absolute coordinates (x1, y1, z1) and sight direction (θi, φi) of a viewer point are inputted from the viewer point information input unit 10 into the relative coordinate calculating unit 12, and absolute coordinates (x2,y2, z2) of the object from the object information input unit 11. In the relative coordinate calculating unit 12, on the basis of these input data, the relative coordinates (r, θ, φ) of the object to the viewer point are calculated. In this case, specific calculation formulas are (1) to (5) below, assuming X=x1−x2, Y=y1−y2, Z=z1−z2.

$$r = (X^2 + Y^2 + Z^2)^{1/2} \quad (1)$$

If X=Y=0, $$\theta = 0 \quad (2)$$

If X≠0 or Y≠0, $$\theta = \tan^{-1}(Y/X) - \theta i \quad (3)$$

If r=0, $$\phi = 0 \quad (4)$$

If r≠0, $$\phi = \sin^{-1}(Z/r) - \phi i \quad (5)$$

The calculated relative coordinates (r, θ, φ) are inputted to the data preparing unit 3 from the relative coordinate calculating unit 12. There subsequent operation is the same as that in the first embodiment, and the description is omitted.

(Eighth embodiment)

In the attribute information presenting apparatus of an eighth embodiment, data (audio data) of attribute information is prepared independently for each one of plural objects, and each is synthesized and delivered. As a result, a system in which plural objects are present can be realized.

Figure 14:
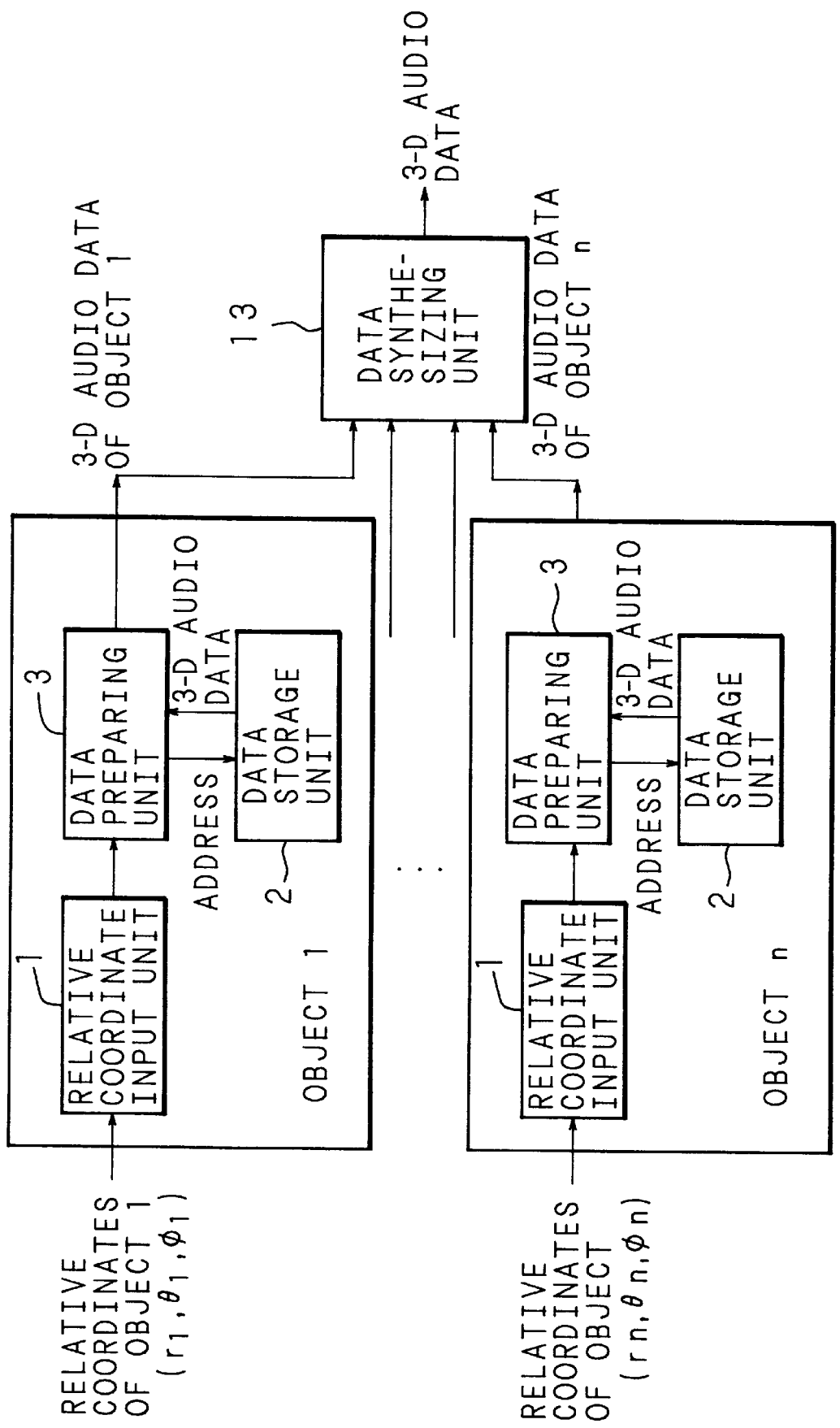
FIG. 14 is a block diagram of an eighth embodiment.

The attribute information presenting apparatus of the eighth embodiment of which constitution is shown in FIG. 14 has a total of n sets of constitution including a relative coordinate input unit 1, a data storage unit 2 and a data preparing unit 3 same as in FIG. 5, one set for each one of n objects, and a data synthesizing unit 13 for synthesizing outputs of n data preparing units 3, that is, three-dimensional audio data of each object.

Processing of the relative coordinate input unit 1, data storage unit 2, and data preparing unit 3 for each object is the same as the processing in the first embodiment, and each data preparing unit 3 prepares three-dimensional audio data of each object, and delivers the prepared data to the data synthesizing unit 13. The data synthesizing unit 13 mixes and delivers the input three-dimensional audio data of each object.

(Ninth embodiment)

In the attribute information presenting apparatus of a ninth embodiment, as the data (audio data) of attribute information to be stored in the data storage unit 2, data (audio data) of attribute information collected by actually disposing the objects at plural relative positions to the reference point (viewer point) are utilized. Hence, data (audio data) of attribute information corresponding to arbitrary relative coordinates can be easily prepared.

Figure 15:
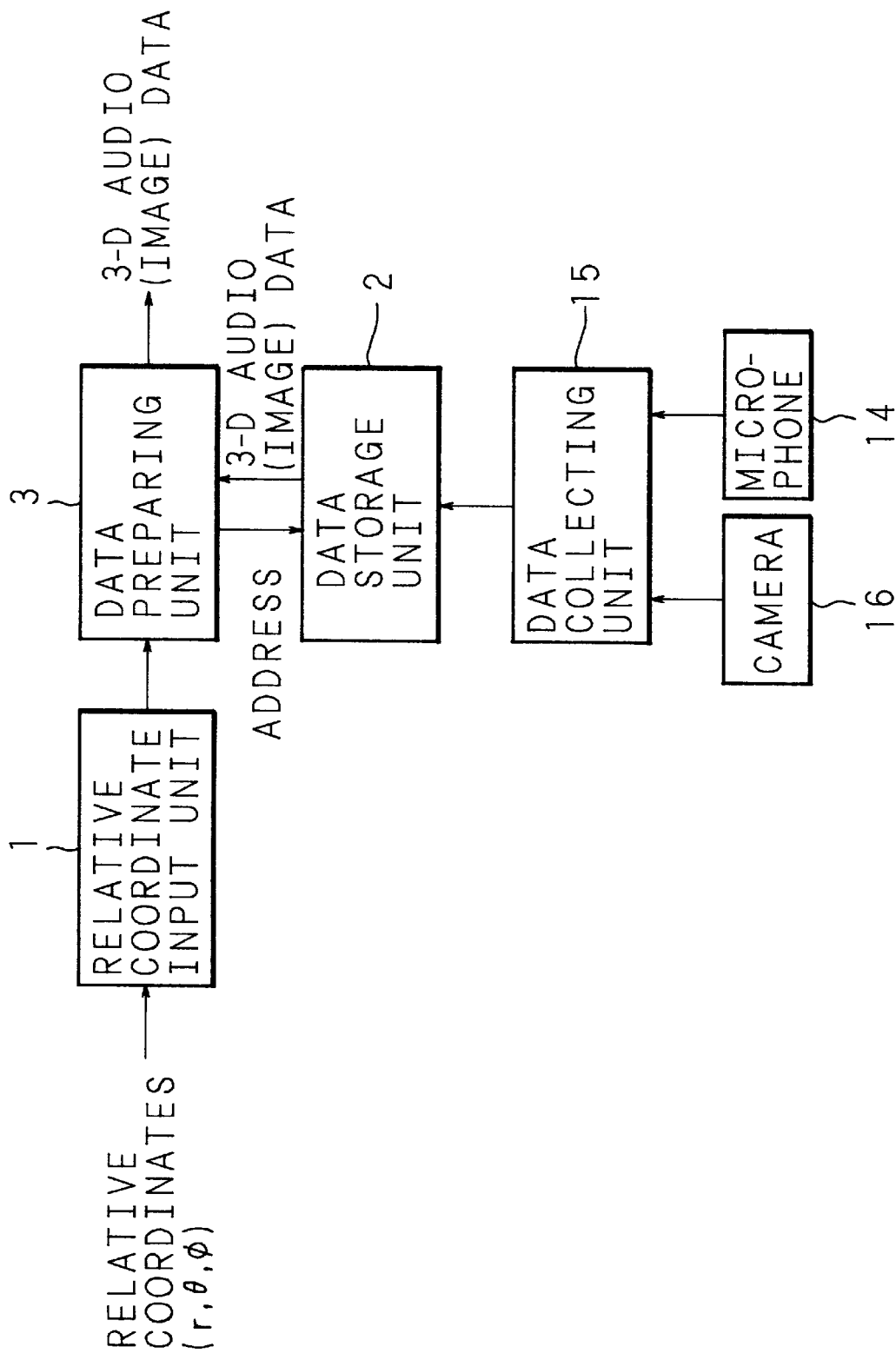
FIG. 15 is a block diagram of a ninth embodiment.

The attribute information presenting apparatus of the ninth embodiment of which constitution is shown in FIG. 15 has the same relative coordinate input unit 1, data storage unit 2 and data preparing unit 3 as in FIG. 5, and also a microphone 14, and a data collecting unit 15 for collecting actual three-dimensional audio data from the microphone 14.

In the data collecting unit 15, the input (three-dimensional audio data) of the microphone 14 in the case where the relative coordinates of the object to the microphone 14 are set to desired values are taken in, and stored in an address region corresponding to the relative coordinates of the data storage unit 2. Processing of the relative coordinate input unit 1, data storage unit 2, and data preparing unit 3 in each object is the same as the processing in the first embodiment, and the description is omitted.

Incidentally, if the data stored in the data storage unit 2 is not three-dimensional audio data but three-dimensional image data of an object, the image data obtained by a camera 16 when the relative coordinates of the object to the camera 16 are set to desired values is taken into the data collecting unit 15, and stored in the address corresponding to the relative coordinates of the data storage unit 2.

(Tenth embodiment)

In the attribute information presenting apparatus of a tenth embodiment, to determine the data (audio data) of attribute information to be stored in the data storage unit 2, data (audio data) of attribute information to be assumed when objects are disposed at plural relative positions to the reference point (viewer point) is created artificially. Hence the data (audio) data of the attribute information to be stored can be prepared in the same system.

Figure 16:
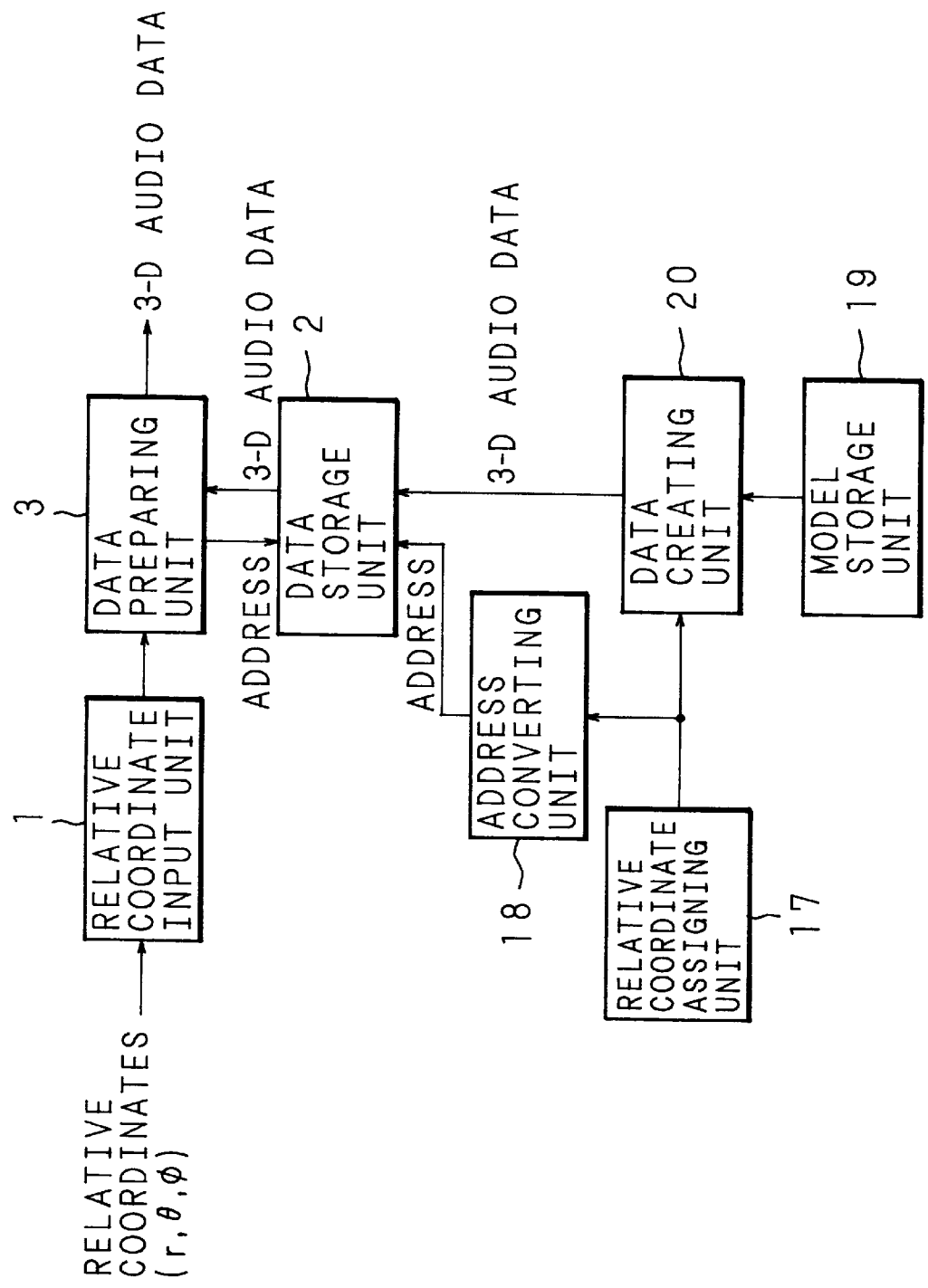
FIG. 16 is a block diagram of a tenth embodiment.

The attribute information presenting apparatus of the tenth embodiment of which constitution is shown in FIG. 16 has the same relative coordinate input unit 1, data storage unit 2 and data preparing unit 3 as in FIG. 5, and also a relative coordinate assigning unit 17 for assigning desired relative coordinates, an address converting unit 18 for converting assigned relative coordinates into an address in the data storage unit 2, a model storage unit 19 for storing the model of three-dimensional audio data of the object, and a data creating unit 20 for creating three-dimensional audio data corresponding to the relative coordinates assigned in the relative coordinate assigning unit 17 on the basis of the model in the model storage unit 19.

The relative coordinates desired to store three-dimensional audio data in the data storage unit 2 are assigned by the relative coordinate assigning unit 17, and successively delivered to the data creating unit 20 and address converting unit 18. In the data creating unit 20, the form of three-dimensional audio data in the case where the object is positioned at the assigned relative coordinates is calculated, and the three-dimensional audio data is delivered to the data storage unit 2. At the address converting unit 18, the assigned relative coordinates are converted into a corresponding address, and delivered to the data storage unit 2. The data storage unit 2 stores the three-dimensional audio data entered from the data creating unit 20 into the address inputted from the address converting unit 18.

(Eleventh embodiment)

In the attribute information presenting apparatus of an eleventh embodiment, when determining data (audio data) of attribute information to be stored in the data storage unit 2, a creating unit of an optimum calculating method is selected from the data creating units (audio data units) of plural pieces of attribute information for realizing mutually different calculating methods. Hence, an optimum calculating method suited to the relative coordinates may be employed.

Figure 17:
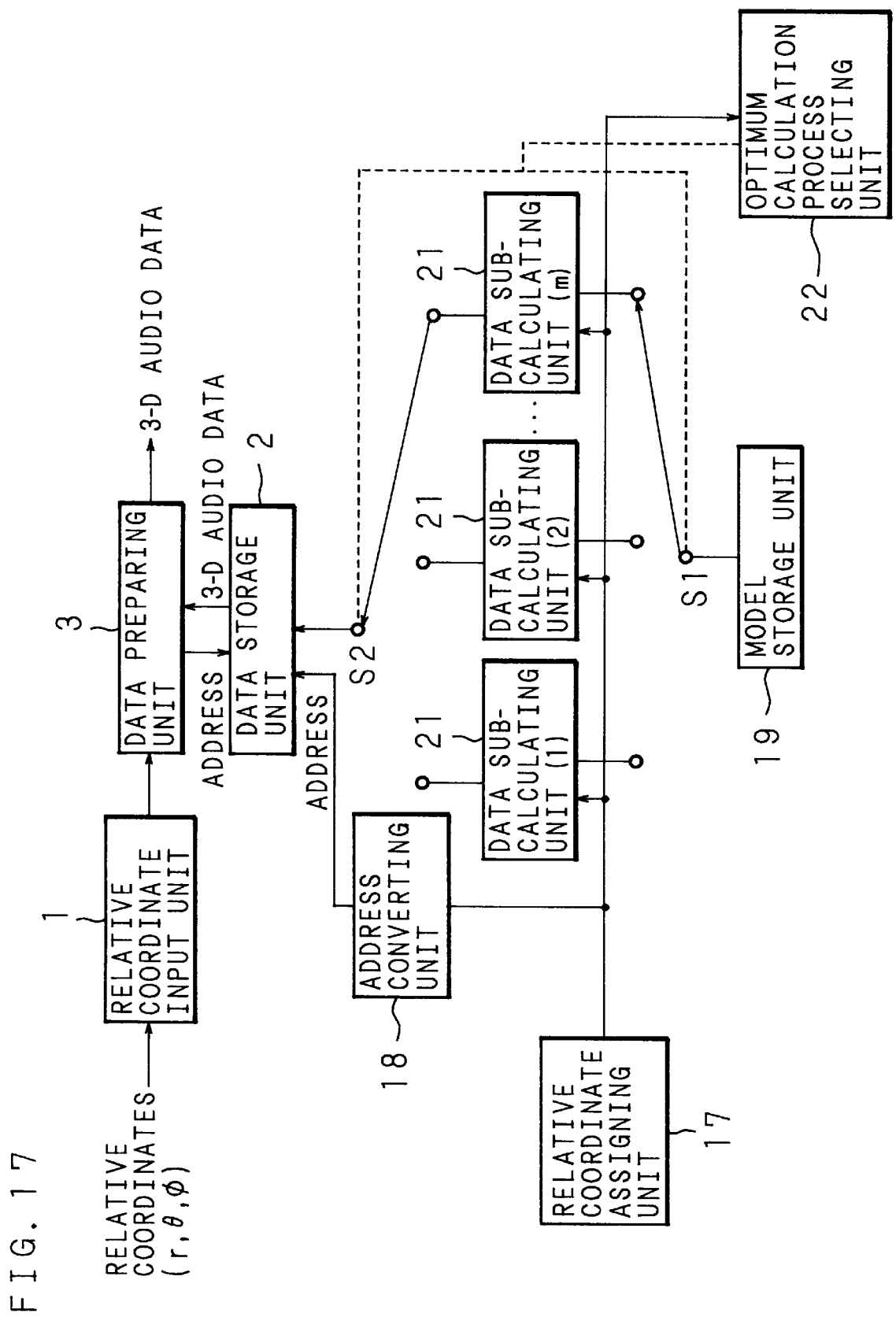
FIG. 17 is a block diagram of a eleventh embodiment.

The attribute information presenting apparatus of the eleventh embodiment of which constitution is shown in FIG. 17 has the same relative coordinate input unit 1, data storage unit 2 and data preparing unit 3 as in FIG. 5, the same relative coordinate assigning unit 17, address converting unit 18, and model storage unit 19 as in FIG. 16, and also m data sub-calculating units 21 for calculating three-dimensional audio data corresponding to the relative coordinates assigned in the relative coordinate assigning unit 17 on the basis of the model in the model storage unit 19, first and second switches S1, S2 for changing over the data sub-calculating units 21 to be connected to the data storage unit 2, and an optimum calculation process selecting unit 22 for manipulating the first and second switches S1, S2 by determining to select which one of the data sub-calculating units 21. Each one of these m data sub-calculating units 21 is different in the calculating method when creating three-dimensional audio data, and the processing result and processing speed is inferior or superior according to the relative coordinates. The optimum calculation process selecting unit 22 selects the optimum data sub-calculating unit 21 among these m data sub-calculating units 21 by changing over the connection of the first and second switches S1, S2.

The relative coordinates desired to store three-dimensional audio data in the data storage unit 2 are assigned in the relative coordinate assigning unit 17, and successively delivered to the address converting unit 18, m data sub-calculating units 21, and optimum calculation process selecting unit 22. In the optimum calculation process selecting unit 22, the optimum data sub-calculating unit 21 is selected by manipulating the switches S1, S2 according to the relative coordinates inputted from the relative coordinate assigning unit 17, and three-dimensional audio data is created in the selected optimum data sub-calculating unit 21.

The created three-dimensional audio data is stored in the address of the data storage unit 2 inputted from the address converting unit 18.

(Twelfth embodiment)

In the attribute information presenting apparatus of a twelfth embodiment, if the data (audio data) of attribute information corresponding to the inputted relative coordinates is not present in the data storage unit 2, when the relative distance is not larger than a specified value, the data (audio data) of plural pieces of attribute information corresponding to the relative coordinates existing near the input relative coordinates are weighted and averaged, and thereby the data (audio data) of attribute information corresponding to the inputted relative coordinates are determined virtually, and when the relative distance is larger than the specified value, the data (audio data) of the attribute information corresponding to the relative coordinates closest to the entered relative coordinates is used as a substitute for the data (audio data) of attribute information corresponding to the inputted relative coordinates. Hence, if the data (audio data) of attribute information corresponding to the inputted relative coordinates is not stored preliminarily, the data (audio data) of attribute information can be prepared virtually by the method suitable for the relative distance.

Figure 18:
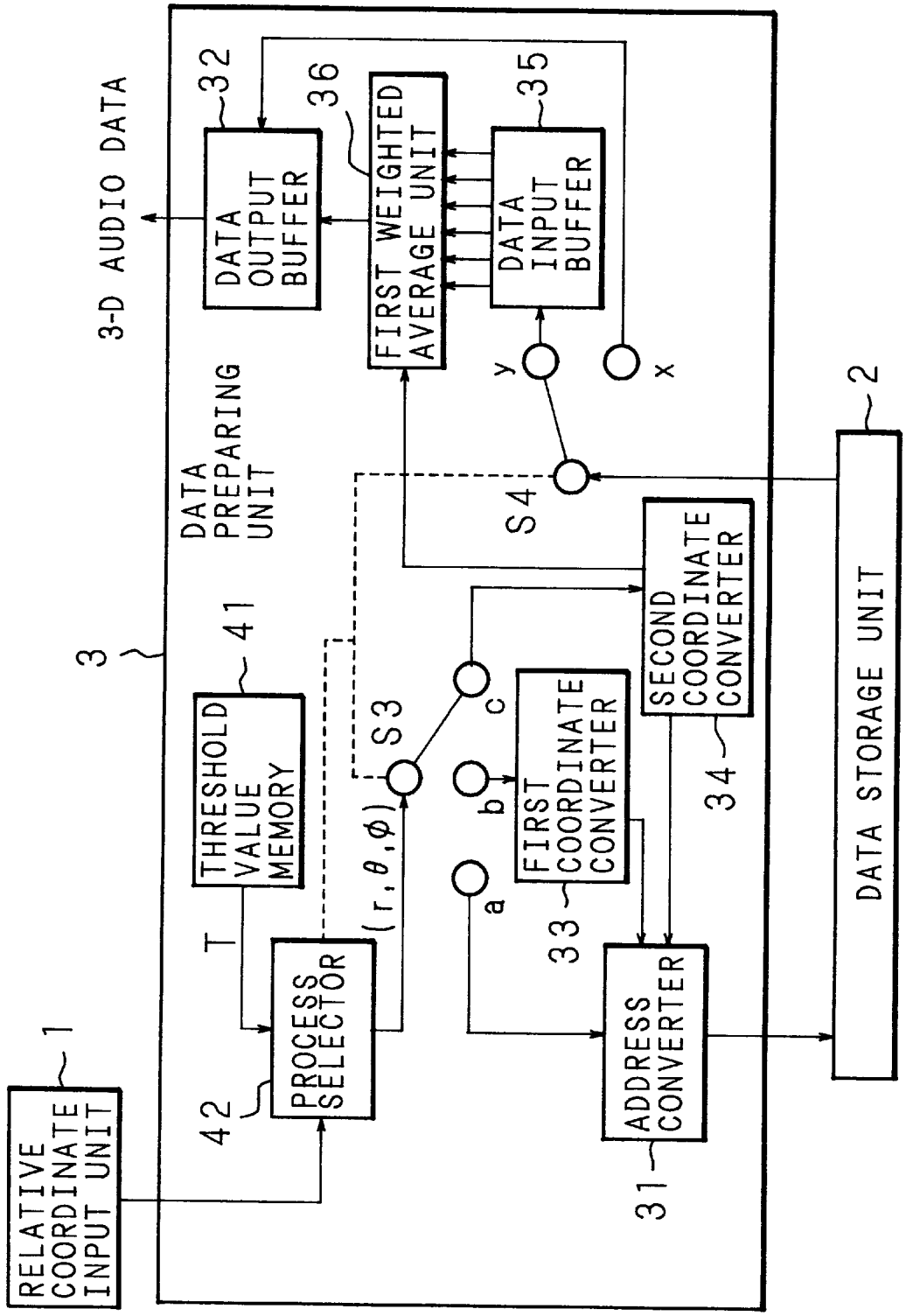

FIG. 18 is a block diagram of the twelfth embodiment, and the constitution is the same as in FIG. 5 except for the data preparing unit 3. The data preparing unit 3 in the twelfth embodiment has a threshold value memory 41 for storing the threshold value T, a process selector 42 for selecting a proper process on the basis of the comparison result of r of input relative coordinate and threshold value T and relative coordinates, an address converting unit 31 same as in FIG. 5, a first coordinate converter 33 same as in FIG. 8, a second coordinate converter 34, a data input buffer 35, and first weighted average unit 36 same as in FIG. 10, a data output buffer 32 same as in FIG. 5, and also a third switch S3 for changing over to connect one of the address converting unit 31 (terminal a), the first coordinate converter 33 (terminal b), and the second coordinate converter 34 (terminal c) with the process selector 42, and a fourth switch S4 for changing over to connect the read output from the data storage unit 2 with one of the data output buffer 32 (terminal x) and data input buffer 35 (terminal y).

When the relative coordinates inputted from the relative coordinate input unit 1 are data presence relative coordinates, the process selector 42 changes over the third switch S3 to terminal a and the fourth switch S4 to terminal x. In this case, three-dimensional audio data is delivered by the same processing operation as in the first embodiment.

When the relative coordinates inputted from the relative coordinate input unit 1 are not data presence relative coordinates, the threshold value T stored in the threshold value memory 41 and the relative distance r of input relative coordinates are compared. If r>T, the process selector 42 changes over the third switch S3 to terminal b and fourth switch S4 to terminal x. At this time, three-dimensional audio data is delivered in the same processing operation as in the above-described third embodiment. On the other hand, if r≦T, the process selector 42 changes over the third switch S3 to terminal c and the fourth switch S4 to terminal y. At this time, three-dimensional audio data is delivered in the same processing operation as in the above-described fourth embodiment.

Thus, in the twelfth embodiment, the three-dimensional audio data corresponding to the relative coordinates in which three-dimensional audio data is not stored in the data storage unit 2, when the relative distance r is greater than the threshold value T, it is substituted by the three-dimensional audio data of the closest relative coordinates, and when the relative distance r is not larger than the threshold value T, it is created by weighting and averaging of three-dimensional audio data of plural adjacent relative coordinates.

(Thirteenth embodiment)

In the attribute information presenting apparatus of a thirteenth embodiment, when the relative distance of the inputted relative coordinates is not smaller than a predetermined value, the data preparing unit 3 does not read out the data (audio data) of attribute information from the data storage unit 2. Hence, when the object is far from the viewer point, data (audio data) of unnecessary attribute information is not delivered, and it is not necessary to store data (audio data) of such unnecessary attribute information, so that the memory capacity of the data storage unit 2 may be saved.

Figure 19:
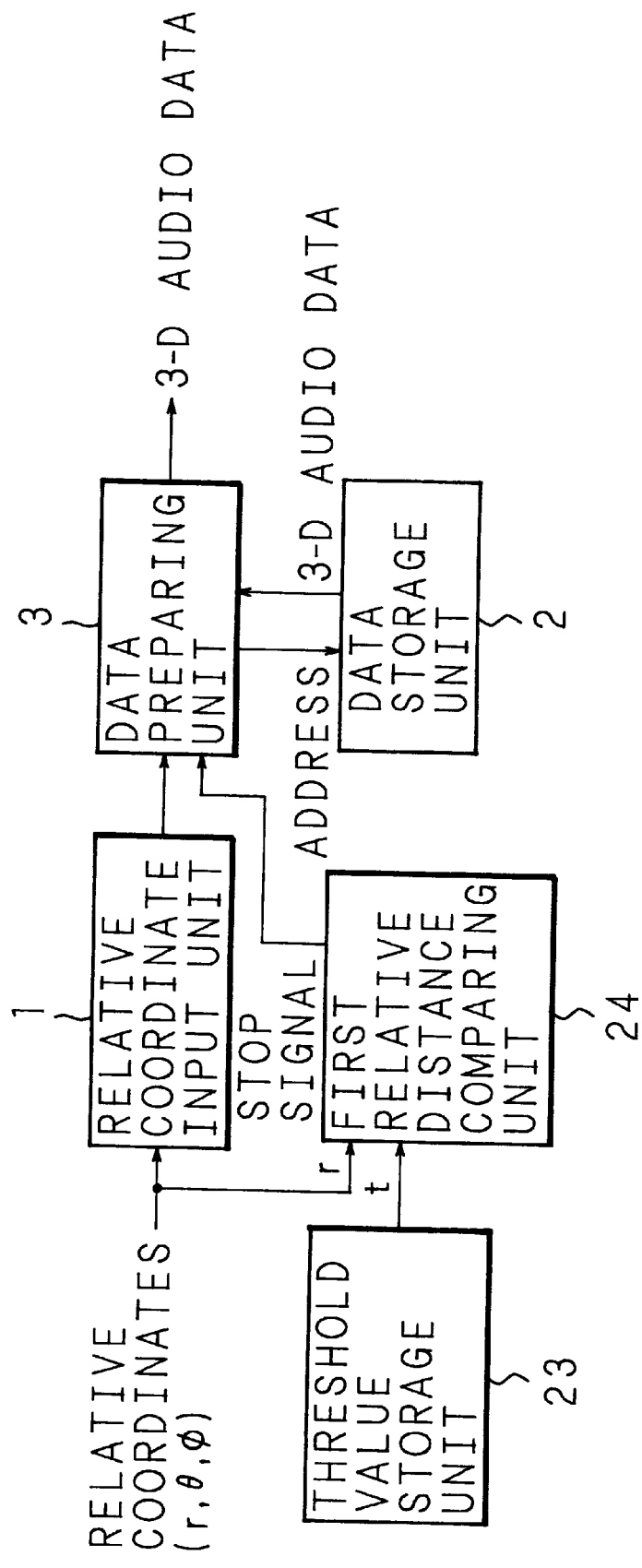
FIG. 19 is a block diagram of a twelfth embodiment.

The attribute information presenting apparatus of the thirteenth embodiment of which constitution is shown in FIG. 19 has the same relative coordinate input unit 1, data storage unit 2 and data preparing unit 3 as in FIG. 5, and a threshold value storage unit 23 for storing the threshold value t, and a first relative distance comparing unit 24 for comparing the relative distance r of input relative coordinates and threshold value t, and delivering a stop signal to the data preparing unit 3 if t≦r. The data preparing unit 3 stops creating process of three-dimensional audio data when a stop signal is sent from the first relative distance comparing unit 24.

In the first relative distance comparing unit 24, the relative distance r of input relative coordinates and threshold value t stored in the threshold value storage unit 23 are compared. If t≦r, a stop signal is delivered to the data preparing unit 3, and three-dimensional audio data is not created. If t>r, on the other hand, stop signal is not delivered, and three-dimensional audio data is delivered in the same processing operation as in the above-described first embodiment.

(Fourteenth embodiment)

In the attribute information presenting apparatus of a fourteenth embodiment, data (audio data) of attribute 10 information of which relative distance corresponds to relative coordinates larger than a predetermined value is not stored in the data storage unit 2, and data (audio data) of attribute information of which relative distance corresponds to relative coordinates in a certain range is substituted by the data (audio data), being changed in size, of attribute information of which relative distance corresponds to smaller relative coordinates than the range. Hence, data (audio data) of attribute information corresponding to relative coordinates remote in relative distance where accuracy is not strictly required is not stored, and hence the memory capacity of the data storage unit 2 can be saved.

Figure 20:
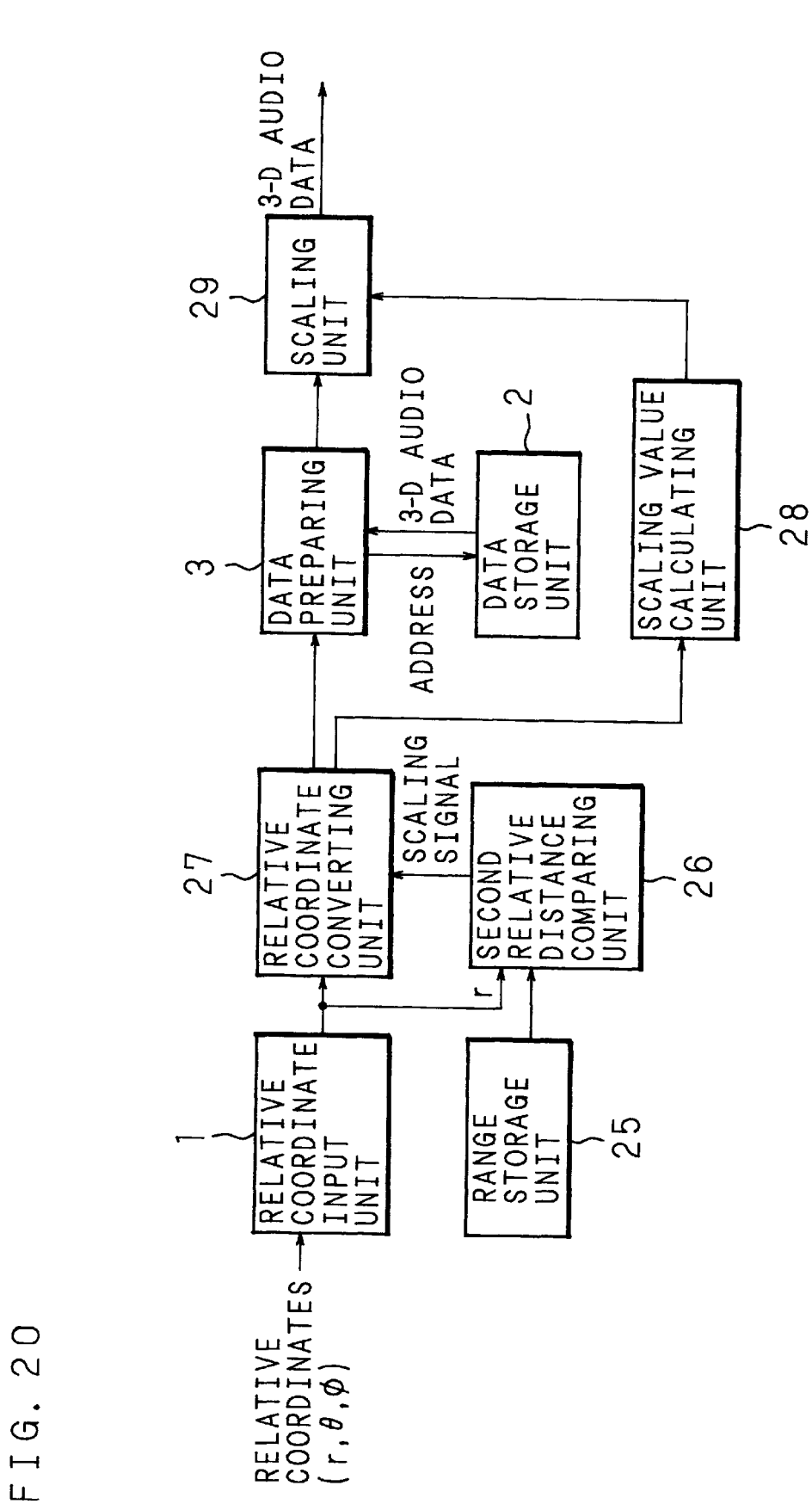
FIG. 20 is a block diagram of a thirteenth embodiment.

The attribute information presenting apparatus of the fourteenth embodiment of which constitution is shown in FIG. 20 has the same relative coordinate input unit 1, data storage unit 2 and data preparing unit 3 as in FIG. 5, and also a range storage unit 25 for storing a specified range (30<r≦60) of relative distance r, a second relative distance comparing unit 26 for comparing the relative distance r of the input relative coordinates and the range stored in the range storage unit 25, and delivering a scaling signal when the relative distance r is within the range, a relative coordinate converting unit 27 for converting the input relative coordinates from the relative coordinate input unit 1 when the scaling signal is inputted, a scaling value calculating unit 28 for calculating the scaling value by the relative coordinates before and after conversion, and a scaling unit 29 for changing the magnitude of the output of the data preparing unit 3 according to the calculated scaling value.

The data storage unit 2 does not store the three-dimensional audio data corresponding to the relative coordinates of which relative distance r is greater than 30.

In the case where the corresponding three-dimensional audio data is provided by changing the magnitude (scaling) thereof, the range of the substitute relative distance r is $30<r\leq 60$, and this range is stored in the range storage unit 25.

For example, when the input relative coordinates are (50, 30, 0), the second relative distance comparing unit 26 compares the input relative distance r (=50) and the range to be stored by the range storage unit 25 ($30<r\leq 60$). Since the relative distance r is within the range, it is judged possible to cope with by changing the magnitude of the three-dimensional audio data stored in the data memory unit 2, and a scaling signal is sent to the relative coordinate converting unit 27. Receiving the scaling signal, the relative coordinate converting unit 27 converts the input relative coordinates (50, 30, 0) into the closest relative coordinates (30, 30, 0) in which the corresponding three-dimensional audio data is stored in the data storage unit 2, and the converted relative coordinates are sent into the data preparing unit 3, and both input relative coordinates and converted relative coordinates are sent into the scaling value calculating unit 28. The scaling value calculating unit 28 calculates the scaling value 0.6 (in this example, the ratio of relative distance) from the received input relative coordinates and converted relative coordinates, and sends it to the scaling unit 29. The scaling unit 29 delivers the three-dimensional audio data corresponding to the relative coordinates (30, 30, 0) delivered from the data preparing unit 3 by changing to the magnitude of 0.6 times according to the scaling value of 0.6 designated by the scaling value calculating unit 28.

(Fifteenth embodiment)

In the attribute information presenting apparatus of a fifteenth embodiment, as for data (audio data) of attribute information having symmetricity, only one side is stored in the data storage unit 2, and when the other data (audio data) of attribute information is needed, the stored data (audio data) of attribute information is used by inverting. Hence, the quantity of data (audio data) of attribute information to be stored in the data storage unit 2 is decreased, so that the memory capacity of the data storage unit 2 may be saved.

Figure 21:
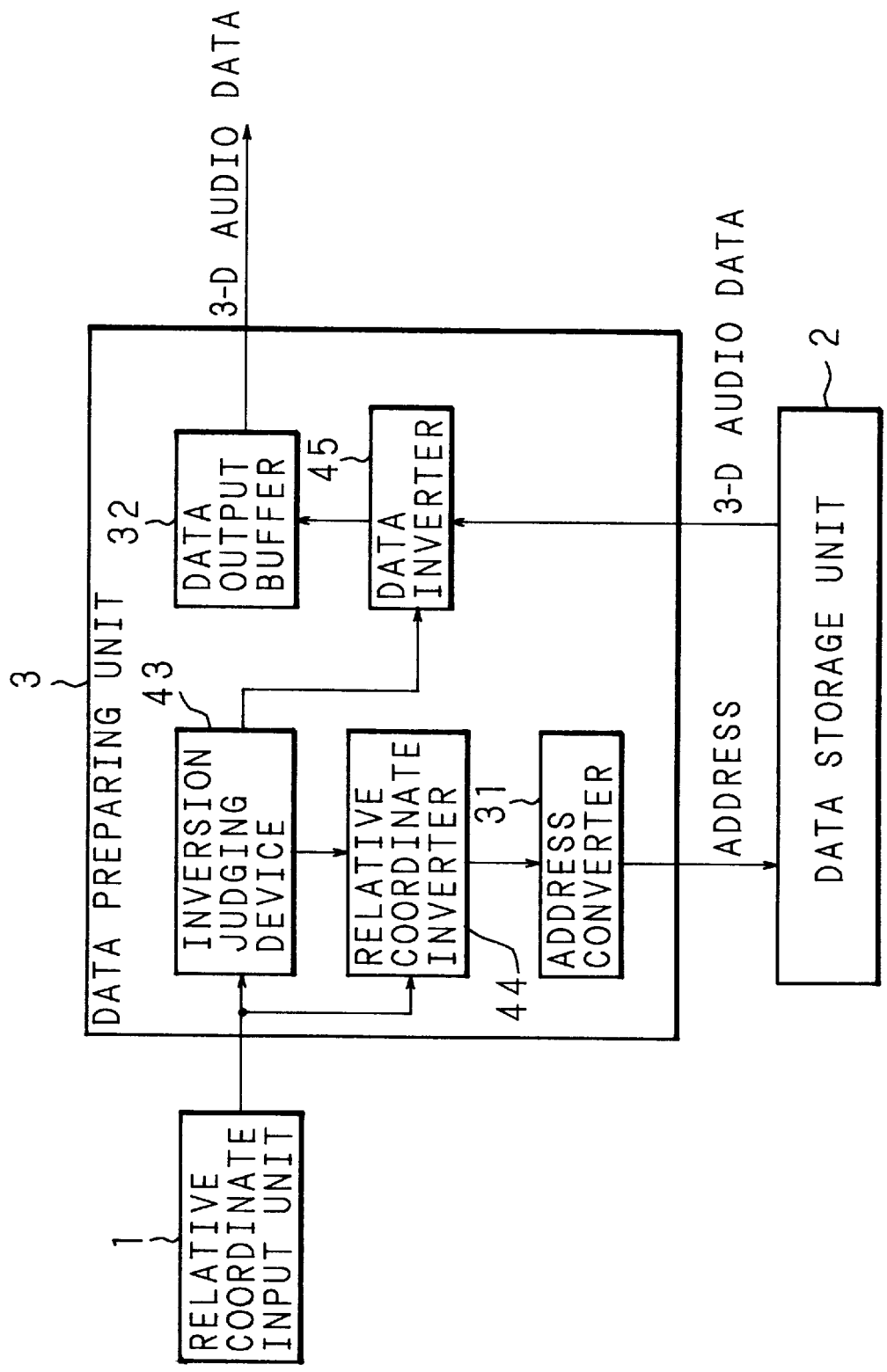
FIG. 21 is a block diagram of a fourteenth embodiment.

FIG. 21 is a block diagram of the fifteenth embodiment, and the constitution is same as in FIG. 5 except for the data preparing unit 3. The data preparing unit 3 in the fifteenth embodiment has an address converter 31 and a data output buffer 32 same as in FIG. 5, and also an inversion judging device 43 for checking if θ of input relative coordinates is negative or not and delivering an instruction signal showing the result, a relative coordinate inverter 44 for inverting the sign of θ of the input relative coordinates when receiving the instruction signal showing θ is negative from the inversion judging device 43 and delivering the signal to the address converter 31, and a data inverter 45 for exchanging L channel and R channel of the data being read out from the data storage unit 2 when receiving the instruction signal showing θ is negative from the inversion judging device 43 and delivering to the data output buffer 32.

The stereophonic audio data stored in the data storage unit 2 is only inverted in L channel and R channel in the relative coordinates (r, θ, φ), (r, −θ, φ): ($0\leq\theta\leq 180$ [degrees]) as far as the layout of surrounding wall and other conditions affecting reverberation and others are symmetrical. By making use of this characteristic, in the data storage unit 2 of the fifteenth embodiment, only three-dimensional audio data corresponding to (r, θ, φ): ($0\leq\theta<180$ [degrees]) is stored.

The inversion judging device 43 judges if θ of the input relative coordinates (r, θ, φ) is negative or not, and if negative, it instructs the relative coordinate inverter 44 to invert the input relative coordinates, and the data inverter 45 to invert the audio data read out from the data storage unit 2. If not negative, it instructs the relative coordinate inverter 44 to deliver the input relative coordinates as they are, and the data inverter 55 to deliver the audio data read out from the data storage unit 2 as it is. The relative coordinate inverter 44 delivers (r, −θ, φ) when the instruction from the inversion judging device 43 is inversion, and delivers the input relative coordinates (r, θ, φ) as they are otherwise.

The data inverter 45, similarly, delivers by exchanging L channel and R channel of audio data being readout from the data storage unit 2 when the instruction from the inversion judging device 43 is inversion, and delivers the read audio data as it is otherwise.

For example, supposing the input relative coordinates to be (10, −60, 10), since θ is negative, they are replaced by (10, 60, 10) in the relative coordinate inverter 41, and three-dimensional audio data corresponding to the relative coordinates (10, 60, 10) is delivered from the data inverter 45. In this way, in the fifteenth embodiment, since the mirror symmetricity can be utilized, the quantity of data stored in the data storage unit 2 can be reduced nearly to half.

Meanwhile, if the attribute information data of the object is not three-dimensional audio data but three-dimensional image data of an object, the fifteenth embodiment can be realized. The case of image data is briefly described below.

The object is a symmetrical building, and in this case the three-dimensional image data is mirror symmetrical, and in the data storage unit 2, therefore, only three-dimensional image data without shading process corresponding to (r, θ, φ): ($0\leq\theta\leq 180$ [degrees]) is stored. Similarly to the case of audio data, the inversion judging device 43 judges if θ of input relative coordinates (r, θ, φ) is negative or not, and if negative, it instructs the relative coordinate inverter 44 to invert the input relative coordinates, and the data inverter 45 to invert the image data being read out from the data storage unit 2. If not negative, on the other hand, it instructs the relative coordinate inverter 44 to deliver the input relative coordinates as they are, and the data inverter 45 to deliver the image data being readout from the data storage unit 2 as it is. The relative coordinate inverter 44 delivers (r, −θ, φ) when the instruction from the inversion judging device 43 is inversion, and delivers the input relative coordinates (r, θ, φ) as they are otherwise. The data inverter 45, similarly, delivers by inverting right and left the bit map of the image data of the building being read out from the data storage unit 2 when the instruction from the inversion judging device 43 is inversion, and delivers the bit map of the image data as it is otherwise.

In the seventh to eleventh, thirteenth and fourteenth embodiments, the constitution of the data preparing unit 3 is the same as that in the first embodiment, but it may also be composed in the same constitution as that in the second to sixth, twelfth and fifteenth embodiments.

As described herein, according to the first aspect, data of attribute information corresponding to various relative coordinates are determined preliminarily, and the data of the determined attribute information are stored, and hence it is not necessary to carry out data creation of a large processing quantity for creating data of attribute information in which the object is present at specific relative coordinates, so that data of attribute information can be prepared in real time without requiring high speed system, and it is also possible to cope with in real time if the object moves very fast.

Figure 22:
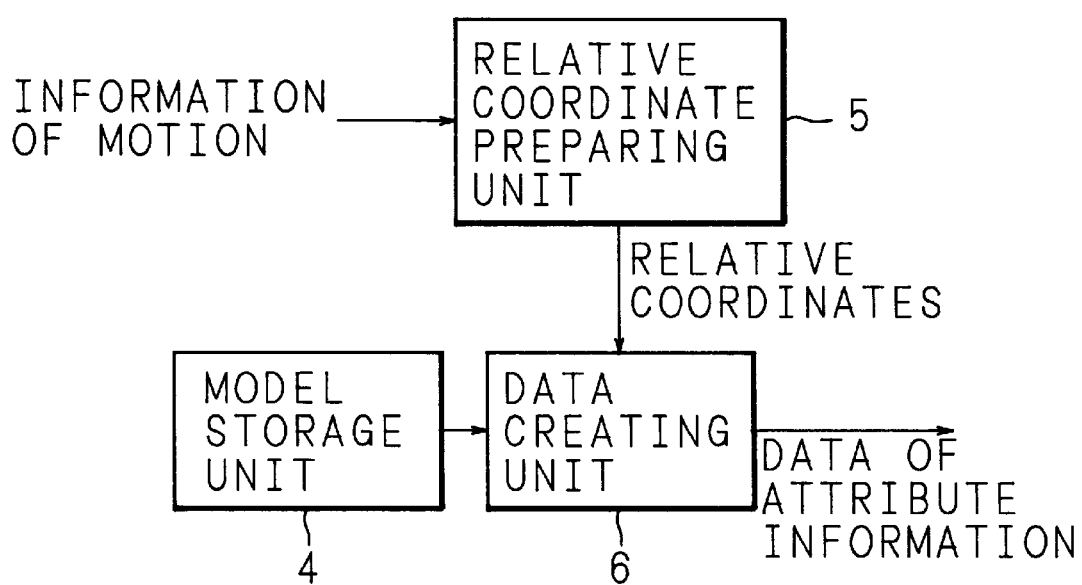
FIG. 22 is a block diagram of a thirteenth embodiment.

FIG. 22 is a block diagram showing the principle of a second aspect. The attribute information presenting apparatus of the second aspect has a model storage unit 4 for storing model data of attribute information on an object, a relative coordinate preparing unit 5 for receiving information on relative motion of the object to a reference point (viewer point) or information on each absolute motion of the reference point (viewer point) and object, and preparing relative coordinates of the object to the reference point (viewer point) on the basis of the motion information in the time course, and a data creating unit 6 for receiving relative coordinates from the relative coordinate preparing unit 5, and creating and delivering data of attribute information according to the input relative coordinates on the basis of the model data in the model storage unit 4.

The information of motion inputted in the relative coordinate preparing unit 5 contains a motion equation of the object and/or viewer point, an initial condition and others, and the relative coordinate preparing unit 5 prepares the relative coordinates of the object to the viewer point at every specific time demanded by the data creating unit 6 on the basis of such information on motion, and delivers the relative coordinates to the data creating unit 6. The data creating unit 6 creates data of attribute information according to the input relative coordinates on the basis of the model data of attribute information being read out from the model storage unit 4.

Thus, according to the second aspect, with an input of information on motion, the transitional relative coordinates of the object to the viewer point are automatically obtained on the basis of the information on motion, and hence if the object and/or viewer point is moving and the relative coordinates of the object to the viewer point change in the time course, it is not necessary to calculate and input the relative coordinates plural times at predetermined time intervals or appropriate intervals as in the prior art, so that the processing may be simplified.

The embodiments of the second aspect (sixteenth embodiment to twenty-second embodiment) are specifically described below. In the following embodiments, the data of attribute information on the object is explained as three-dimensional audio data.

(Sixteenth embodiment)

Figure 23:
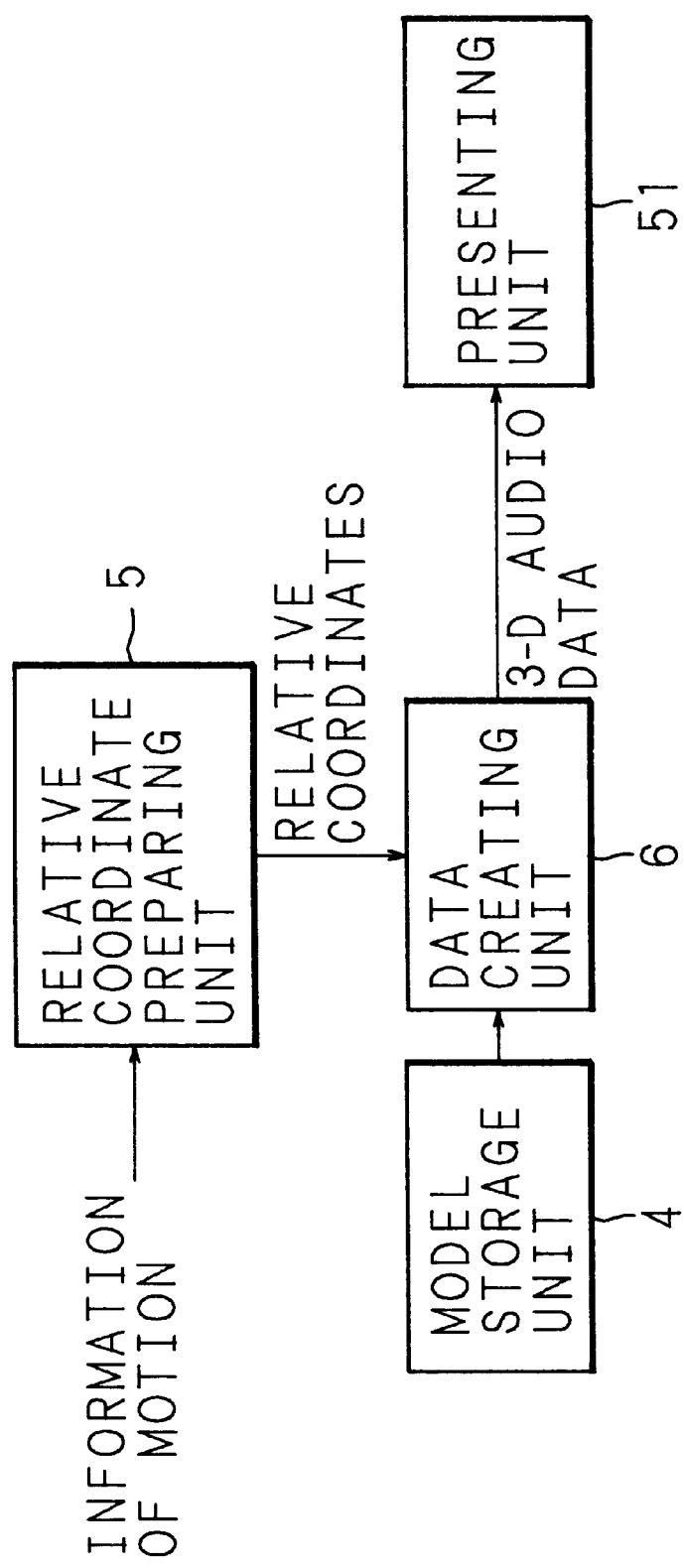
FIG. 23 is a block diagram of a sixteenth embodiment.

FIG. 23 is a block diagram of a sixteenth embodiment. The attribute information presenting apparatus of the sixteenth embodiment has a model storage unit 4 for storing model data of three-dimensional audio data of an object, a relative coordinate preparing unit 5 for determining relative coordinates of the object to a viewer point transitionally on the basis of the input information on relative motion of the object to the object or absolute motion of the viewer point or object, a data creating unit 6 for creating three-dimensional audio data as attribute information on the basis of the model data in the model storage unit 4 according to the relative coordinates inputted from the relative coordinate preparing unit 5, and a presenting unit 51 for presenting sound on the basis of the three-dimensional audio data inputted from the data creating unit 6.

The relative coordinate preparing unit 5 receives information on relative motion of the object to the viewer point (motion equation of relative motion, initial condition, etc.), or information on each absolute motion of the viewer point and object (motion equation of absolute motion, initial condition, etc.), and calculates the relative coordinates of the object to the viewer point transitionally on the basis of the information on motion, and delivers the relative coordinate string to the data creating unit 6. The data creating unit 6 reads out the model data of three-dimensional audio data from the model storage unit 4, and creates three-dimensional audio data according to the relative coordinates inputted from the relative coordinate preparing unit 5 by referring to the model data being read out, and delivers the created data to the presenting unit 51. The presenting unit 51 issues the sound on the basis of the three-dimensional audio data.

(Seventeenth embodiment)

In the attribute information presenting apparatus of a seventeenth embodiment, on the basis of the name of a motion pattern showing the type of relative motion of an object to the reference point (viewer point) and the parameter of the motion pattern, the transitional relative coordinates of the object to the reference point (viewer point) are determined. As a result, the relative coordinates in the relative motion of a specific kind can be easily obtained.

Figure 24:
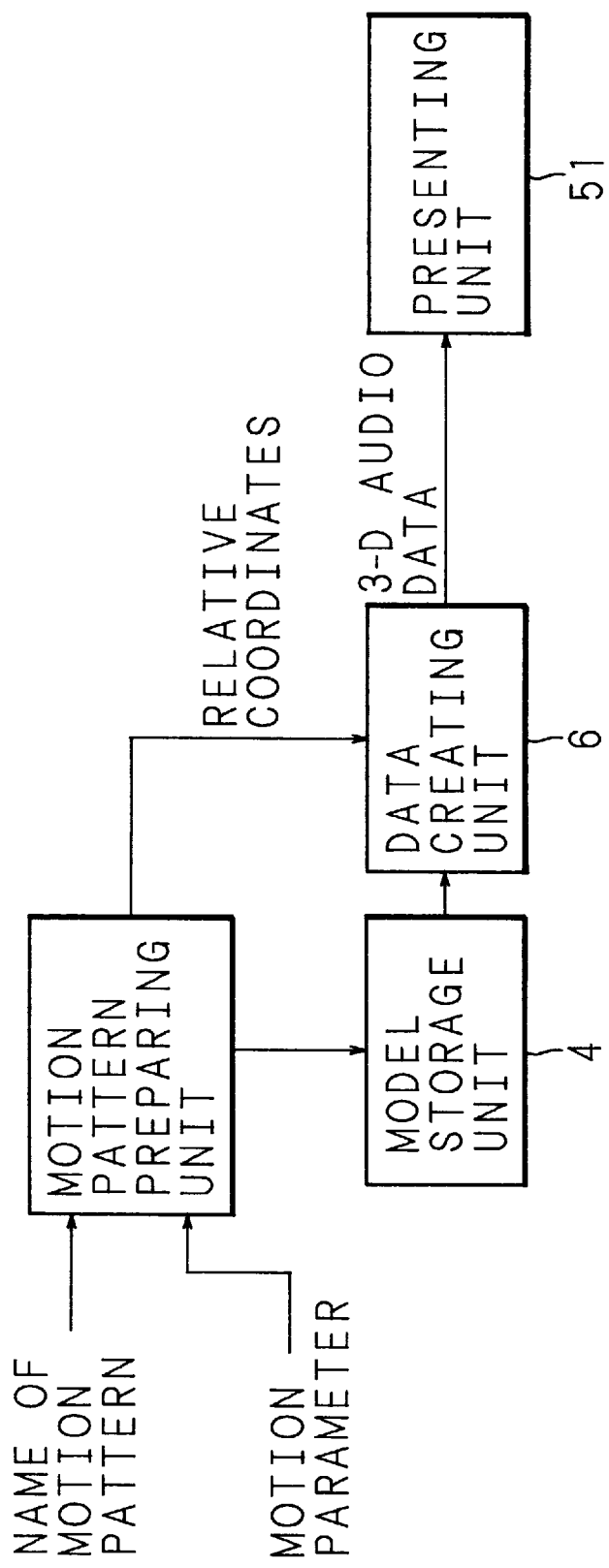
FIG. 24 is a block diagram of a seventeenth embodiment.

The attribute information presenting apparatus of the seventeenth embodiment of which constitution is shown in FIG. 24 has a model storage unit 4, a data creating unit 6 and a presenting unit 51 same as in FIG. 23, and also a motion pattern preparing unit 52 for receiving the name of motion pattern showing the type of relative motion of the object to the viewer point (name of motion pattern) and parameter of the relative motion (motion parameter), and transitionally calculating the relative coordinates of the object to the viewer point and delivering the result to the data creating unit 6.

For example, suppose the uniform linear motion is expressed as $$(x, y, z)=(x1, y0, z0)+(a, b, c)t$$

in the motion pattern preparing unit 52. At this time, in the motion pattern preparing unit 52, when uniform linear motion is inputted as the name of motion pattern, and {100, 0, 10, −5, 0, 0} (unit: m) as respective motion parameters {x0, y0, z0, a, b, c}, the motion pattern preparing unit 52 calculates the relative coordinates in every predetermined time as the data creating unit 6 demands relative coordinates, and delivers the result to the data creating unit 6. In the data creating unit 6, three-dimensional audio data corresponding to the relative coordinates calculated on the basis of the model data of the three-dimensional audio data in the model storage unit 4 is created, and the three-dimensional audio data is inputted to the presenting unit 51. As a result, the three-dimensional sound emitted from the object when the object flies from the straight front to the straight rear direction uniformly and linearly 10 m above the viewer point is issued from the presenting unit 51.

(Eighteenth embodiment)

In the attribute information presenting apparatus of an eighteenth embodiment, typical patterns of relative motion of the object to the reference point (viewer point) are stored, and one pattern of relative motion is selected from the stored patterns of relative motion, and the selected pattern of relative motion is designated, and the parameter specified in the pattern of the relative motion is applied, and the time series of the relative coordinates of the motion to the reference point (viewer point) is determined. Hence, relative coordinates may be easily obtained among various types of relative motions.

Figure 25:
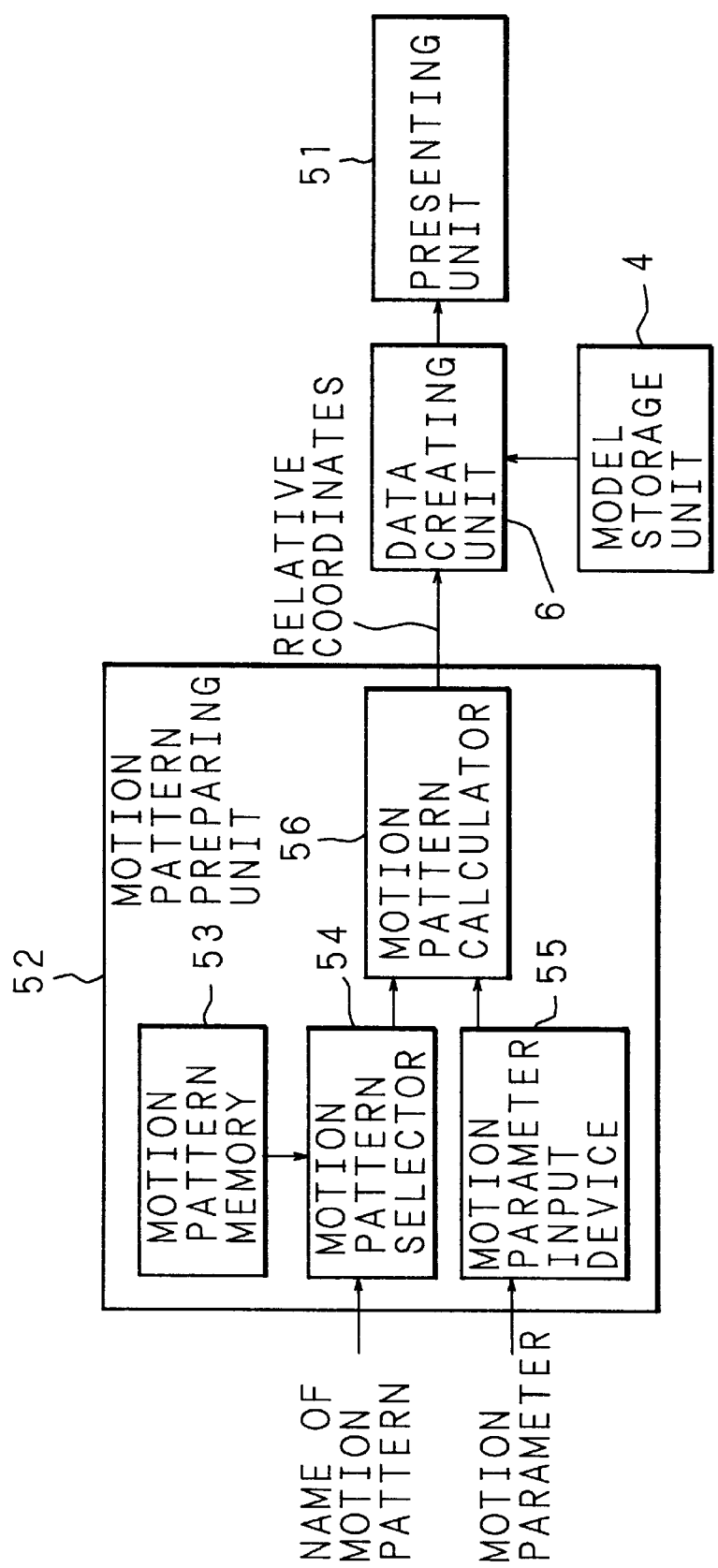
FIG. 25 is a block diagram of an eighteenth embodiment.

FIG. 25 is a block diagram of the eighteenth embodiment. The constitution except for the motion pattern preparing unit 52 is the same as that in FIG. 24. The motion pattern preparing unit 52 in the attribute information presenting apparatus of the eighteenth embodiment has a motion pattern memory 53 for storing plural types of motion pattern, a motion pattern selector 54 for selecting a corresponding motion pattern from the motion pattern memory 53 according to the inputted name of motion pattern, a motion parameter input device 55 for inputting a motion parameter, and a motion pattern calculator 56 for transitionally calculating the relative coordinates of the object to the viewer point on the basis of the selected motion pattern and inputted motion parameter and delivering the result to the data creating unit 6.

In the motion pattern preparing unit 52, the motion pattern selector 54 selects a corresponding pattern from the motion pattern memory 53 storing several motion patterns as shown in FIG. 26 according to the inputted name of motion pattern, and delivers the selected pattern to the motion pattern calculator 56. The motion parameter for controlling the modified type of the motion pattern is designated by the motion parameter input device 55. In the motion pattern calculator 56, according to this motion pattern and motion parameter, the relative coordinates of the object to the viewer point are calculated and delivered in every predetermined time demanded by the data creating unit 6.

Figure 27:
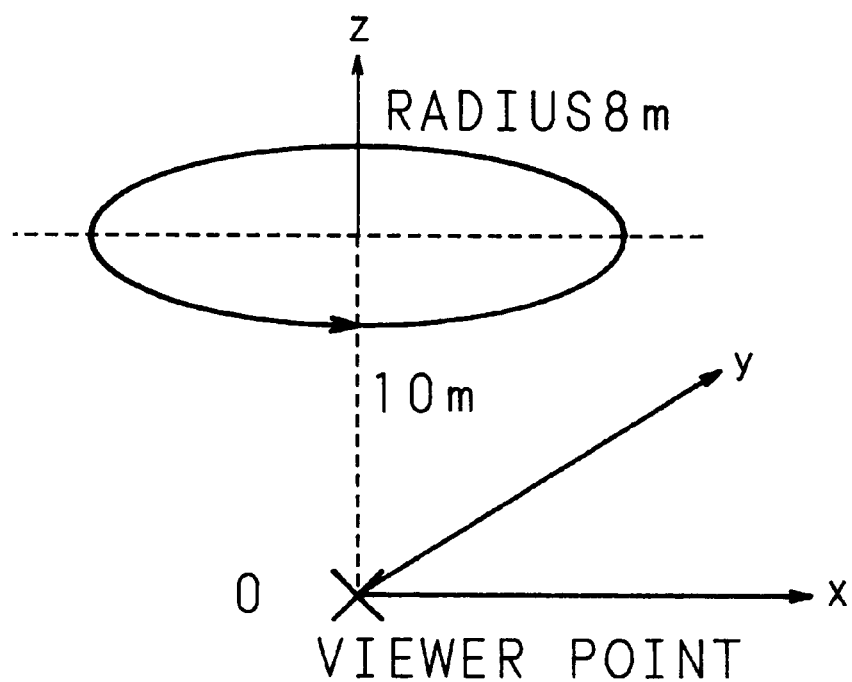
FIG. 27 is a diagram showing a pattern example of circular motion.

For example, by designating uniform circular motion as the name of motion pattern, and initial relative coordinates (8, 0, 10), radius 8, circle center relative coordinates (0, 0, 10), angular velocity $\pi/180$, and normal vector of plane including circle (0, 0, 1) as the corresponding motion parameters in the motion parameter input device 55, the relative coordinates of the object making a motion as shown in FIG. 27 are calculated and delivered transitionally in the motion pattern calculator 56 at every predetermined time demanded by the data creating unit 6.

The subsequent operating process of the data creating unit 6, model storage unit 4, and presenting unit 51 is the same as that in the seventeenth embodiment, and the description is omitted.

Figure 28:
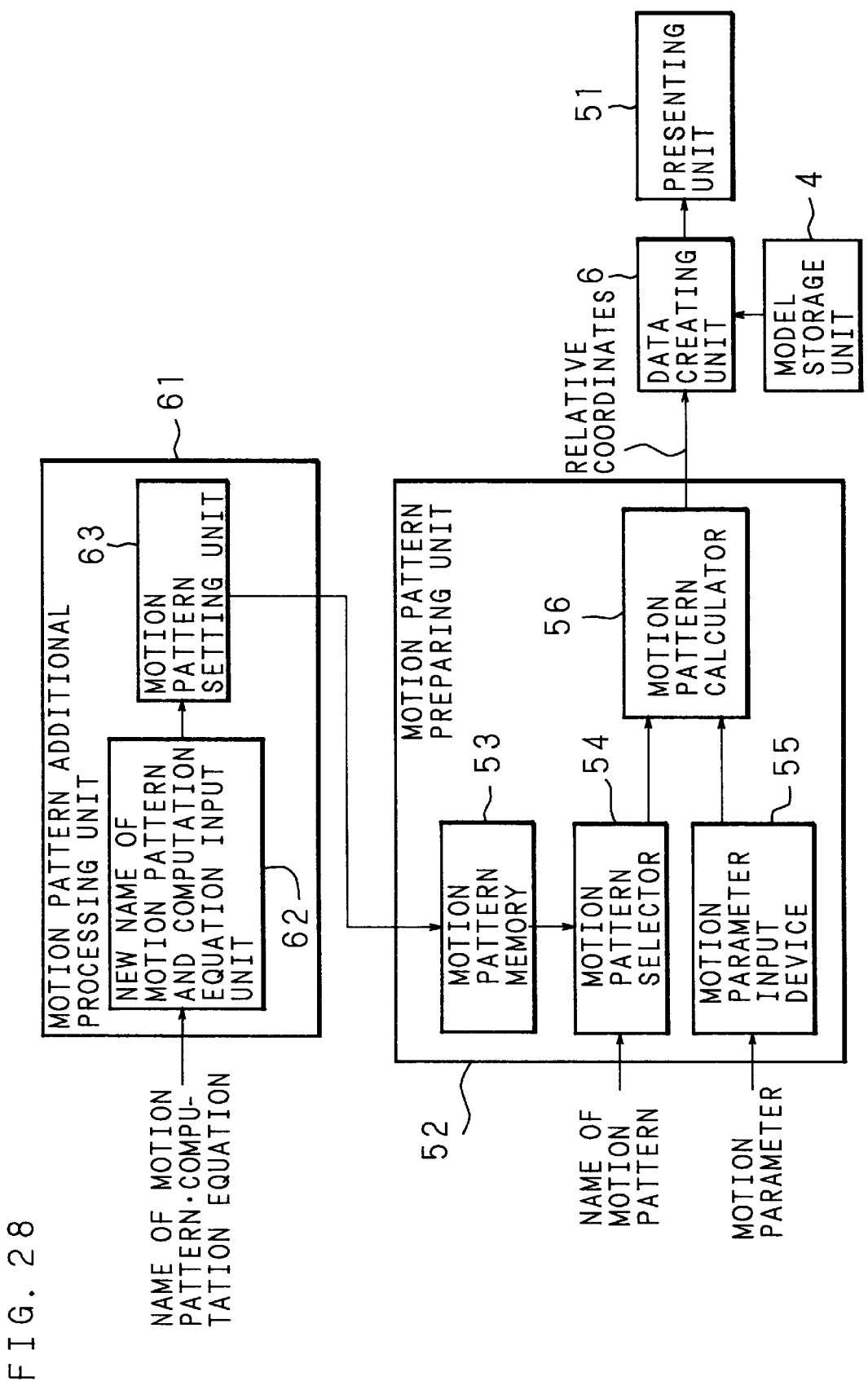
FIG. 28 is a block diagram of a modified example of the eighteenth embodiment.

Incidentally, the types of motion pattern stored in the motion pattern memory 53 may be fixed, but it is practicable to add and store new motion patterns. FIG. 28 is a block diagram of a modified example of the eighteenth embodiment of such case. In FIG. 28, the same reference numerals as in FIG. 25 show identical parts. In the modified example in FIG. 25, a motion pattern additional processing unit 61 is added to the constitution in FIG. 25. The motion pattern additional processing unit 61 includes a new name of motion pattern and computation equation input unit 62 for entering the name of motion pattern showing a new type of relative motion and its computation equation from outside, and a motion pattern setting unit 63 for converting the input name of motion pattern and computation equation into a data format of the motion pattern memory 53 and delivering them.

When additionally storing a novel motion pattern in the motion pattern memory 53, the name and computation equation of the novel motion pattern are inputted to the motion pattern setting unit 63 by using the new name of motion pattern and computation equation input unit 62. The motion pattern setting unit 63 converts the inputted name and computation equation of the motion pattern so as to be matched with the data format of the motion pattern memory 53, and delivers them to the motion pattern memory 53 together with an addition instruction. Receiving the addition instruction, the motion pattern memory 53 stores the name and computation equation of the new motion pattern inputted at the same time.

(Nineteenth embodiment)

In the attribute information presenting apparatus of a nineteenth embodiment, typical patterns of relative motion of the object to the reference point (viewer point) are stored, one pattern of relative motion is selected from the stored patterns of relative motion, a parameter of selected relative motion is specified, the relative motion parameter having the parameter applied in the pattern of relative motion is generated every time it is changed, and the time series of the relative coordinates of the object to the reference point (viewer point) is determined by the generated parameter of relative motion. Hence, the relative motion parameter is generated only when the pattern of the relative motion is changed, and hence processing is wasteless.

Figure 29:
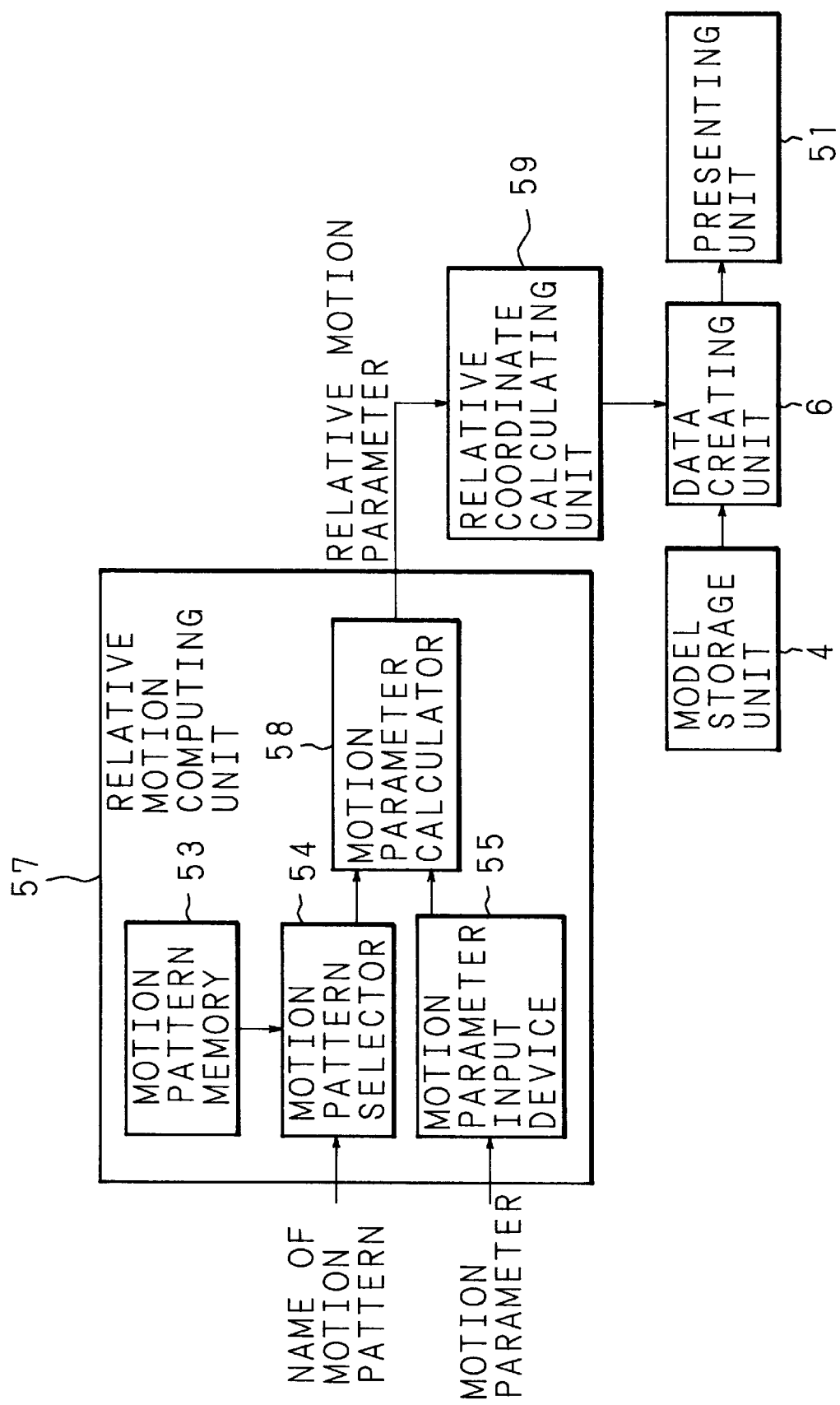
FIG. 29 is a block diagram of a nineteenth embodiment.

The attribute information presenting apparatus of the nineteenth embodiment of which constitution is shown in FIG. 29 has a model storage unit 4, a data creating unit 6, and a presenting unit 51 same as in FIG. 23, and also a relative motion computing unit 57 for determining and delivering a relative motion parameter of the object to the viewer point every time a relative motion command changes according to the inputted name of motion pattern and motion parameter, and a relative coordinate calculating unit 59 for calculating the relative coordinates of the object to the viewer point from the inputted relative motion parameter. The relative motion computing unit 57 includes a motion pattern memory 53, a motion pattern selector 54, and a motion parameter input device 55 same as in FIG. 25, and also a motion parameter calculator 58 for calculating the relative motion parameter on the basis of the outputs of the motion pattern selector 54 and motion parameter input device 55, and delivering the calculated relative motion parameter to the relative coordinate calculating unit 59 every time it changes.

In the motion parameter calculator 58, according to the motion pattern inputted from the motion pattern selector 54 and motion parameter inputted from the motion parameter input device 55, every time the relative motion parameter is changed, the relative motion parameter is delivered to the relative coordinate calculating unit 59. For example, when the "ball" shown in FIG. 26 is specified as the motion pattern, the relative motion pattern is delivered only when the ball hits against the wall and the quantity of relative motion is changed. In the relative coordinate calculating unit 59, on the basis of the relative motion parameter, the relative coordinates are calculated, and delivered to the data creating unit 6. The subsequent operating process of the data creating unit 6, model memory unit 4 and presenting unit 51 is the same as that in the seventeenth embodiment, and the description is omitted.

The output of the motion parameter calculator 58 may be produced at every specific time. Alternatively, an FIFO buffer may be provided in the input unit of the relative coordinate calculating unit 59, the relative motion parameter delivered by the motion parameter calculator 58 and the time information on the time required for the relative motion parameter to change are combined, and the relative coordinate calculating unit 59 may use the relative motion parameter at the beginning of the buffer according to the time information forming a pair therewith. Furthermore, the same as in the example shown in FIG. 28, it may be also composed to store a new motion pattern additionally in the motion pattern memory 53.

(Twentieth embodiment)

In the attribute information presenting apparatus of a twentieth embodiment, on the basis of names of motions patterns showing various types of absolute motion of the reference point (viewer point) and object, and parameters of their motion patterns, transitional relative coordinates of the object to the reference point (viewer point) are determined. As a result, relative coordinates in specific types of absolute motion of the reference point (viewer point) and object are easily obtained.

Figure 30:
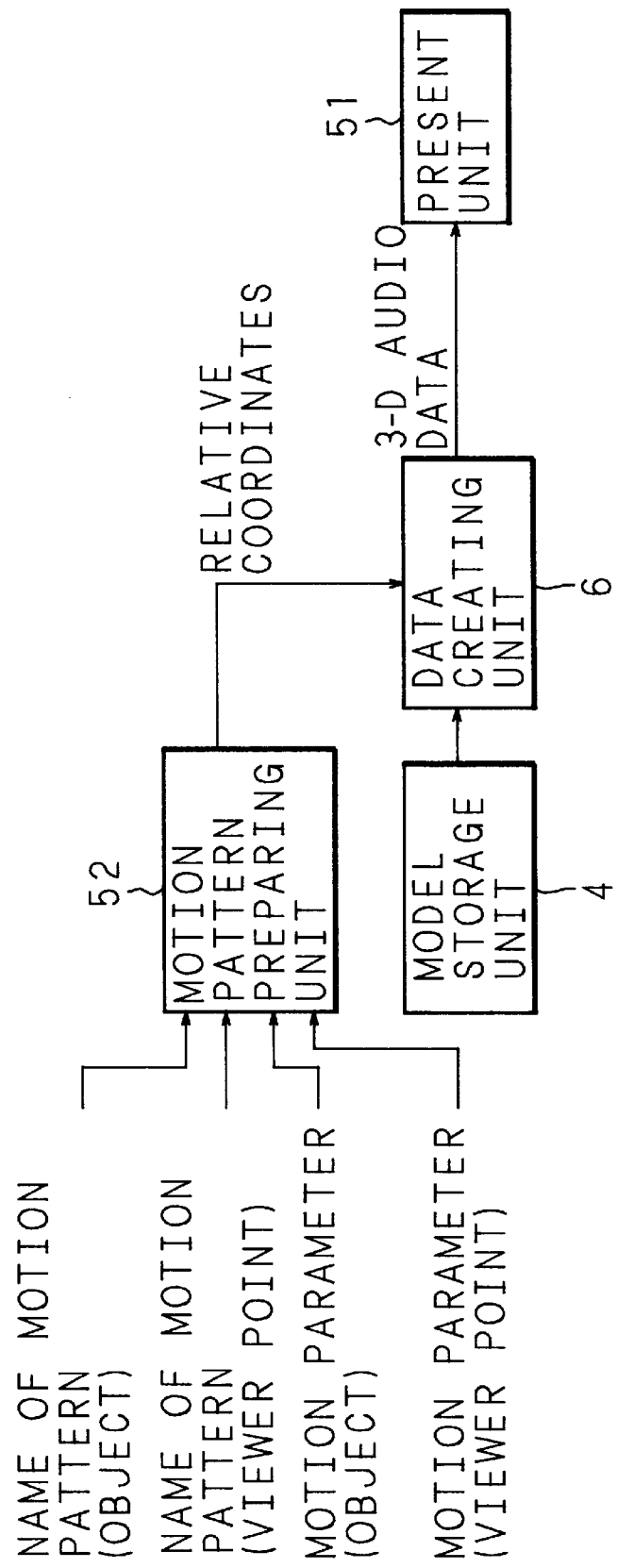
FIG. 30 is a block diagram of a twentieth embodiment.

The attribute information presenting apparatus of the twentieth embodiment of which constitution is shown in FIG. 30 has a model storage unit 4, a data creating unit 6, and a presenting unit 51 same as in FIG. 23, and also a motion pattern preparing unit 52 for receiving names of motion patterns showing types of absolute motions of the object and viewer point (names of motion patterns) and parameters of absolute motions (motion parameters), calculating the relative coordinates of the object to the viewer point in the time course, and delivering the result to the data creating unit 6.

In the motion pattern preparing unit 52, when motion patterns of absolute motions of the object and viewer point and motion parameters are inputted, the motion pattern preparing unit 52 calculates the relative coordinates at every predetermined time of the relative coordinates demanded by the data creating unit 6, and delivers the results to the data creating unit 6. In the data creating unit 6, three-dimensional audio data corresponding to the calculated relative coordinates is created on the basis of the model data of the three-dimensional audio data in the model storage unit 4, and the three-dimensional audio data is inputted to the presenting unit 51.

(Twenty-first embodiment)

In the attribute information presenting apparatus of a twenty-first embodiment, typical patterns of absolute motion of the reference point (viewer point) and object are stored, and one pattern of absolute motion is selected from the stored absolute motion patterns, and the parameter of each selected absolute motion is specified, and the parameter specified in each pattern of absolute motion is applied, and the absolute coordinates of the reference point (viewer point) and object are determined in time series, respectively, and the time series of the relative coordinates of the object to the reference point (viewer point) is determined from the determined absolute coordinates. Hence, relative coordinates are easily obtained in various types of absolute motions.

Figure 31:
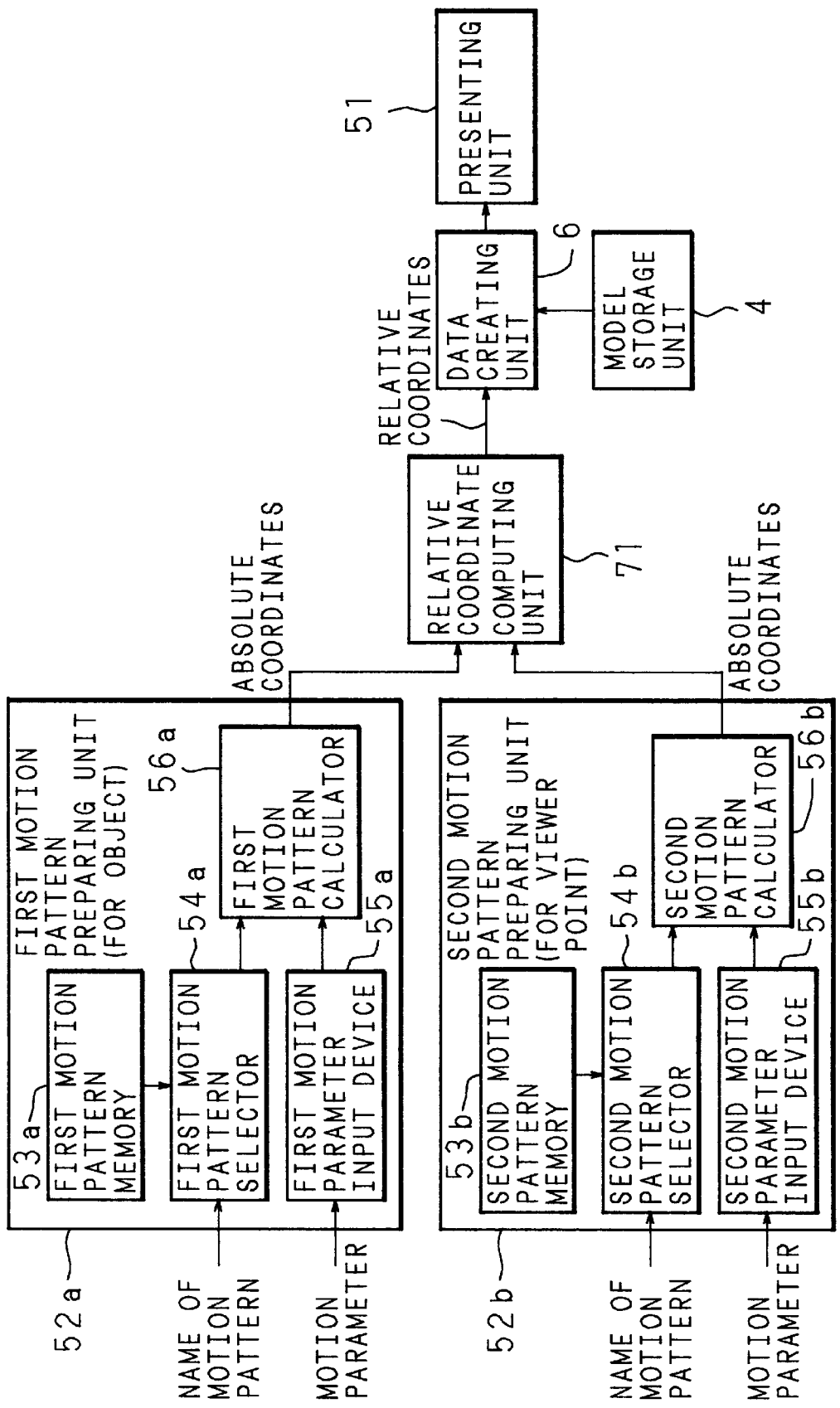
FIG. 31 is a block diagram of a twenty-first embodiment.

FIG. 31 is a block diagram of the twenty-first embodiment.

The constitution is the same as that in FIG. 30 except for the motion pattern preparing unit 52. The motion pattern preparing unit 52 of the attribute information presenting apparatus of the twenty-first embodiment has a first motion pattern preparing unit 52a for calculating the absolute coordinates of the object by calculating the absolute motion of the object, a second motion pattern preparing unit for calculating the absolute coordinates of the viewer point by calculating the absolute coordinates of the viewer point, and a relative coordinate computing unit 71 for determining the relative coordinates of the object to the viewer point according to the absolute coordinates of the object from the first motion pattern preparing unit 52a and the absolute coordinates of the viewer point from the second motion pattern preparing unit 52b.

The first motion pattern preparing unit 52a has a first motion pattern memory 53a for storing plural types of motion pattern of the object, a first motion pattern selector 54a for selecting a corresponding motion pattern from the first motion pattern memory 53a according to the inputted name of motion pattern of the object, a first motion parameter input device 55a for inputting the motion parameter of the object, and a first motion pattern calculator 56a for calculating the absolute coordinates of the object on the basis of the selected motion pattern and inputted motion parameter, and delivering the result to the relative coordinate computing unit 71. The second motion pattern preparing unit 52b has a second motion pattern memory 53b for storing plural types of motion pattern of the viewer point, a second motion pattern selector 54b for selecting a corresponding motion pattern from the second motion pattern memory 53b according to the inputted name of motion pattern of the viewer point, a second motion parameter input device 55b for inputting the motion parameter of the viewer point, and a second motion pattern calculator 56b for calculating the absolute coordinates of the viewer point on the basis of the selected motion pattern and inputted motion parameter, and delivering the result to the relative coordinate computing unit 71.

In the first motion pattern preparing unit 52a, the first motion pattern selector 54a selects a corresponding pattern, according to the inputted name of motion pattern of the object, from the first motion pattern memory 53a storing several motion patterns as shown in FIG. 26, and delivers the selected pattern to the first motion pattern calculator 56a. The motion parameter for controlling modified types of the motion pattern is specified in the first parameter input device 55a. In the first motion pattern calculator 56a, according to this motion pattern and motion parameter, the absolute coordinates of the object are calculated in time course. In the second motion pattern preparing unit 52b, the second motion pattern selector 54b selects a corresponding pattern, according to the inputted name of motion pattern of the viewer point, from the second motion pattern memory 53b storing several motion patterns as shown in FIG. 26, and delivers the selected pattern to the second motion pattern calculator 56b. The motion parameter for controlling modified types of the motion pattern is specified in the second parameter input device 55b. In the second motion pattern calculator 56b, according to this motion pattern and motion parameter, the absolute coordinates of the viewer point are calculated in time course. Thus, from the absolute coordinates of the object and viewer point, the relative coordinates of the object to the viewer point are determined and delivered to the relative coordinate computing unit 71 at every predetermined time demanded by the data creating unit 6.

The subsequent operating process of the data creating unit 6, model storage unit 4 and presenting unit 51 is the same as in the twentieth embodiment, and the description is omitted. Besides, the same as in the example shown in FIG. 25, it may be also composed to additionally store new motion patterns in the first and second motion pattern memories 53a, 53b.

(Twenty-second embodiment)

In the twenty-second embodiment, typical patterns of absolute motion of the reference point (viewer point) and object are stored, and one pattern of absolute motion is selected from the stored patterns of absolute motion, and the specified parameter of the absolute motion is specified, and the absolute motion parameter applying each parameter specified in each pattern of absolute motion is generated every time it is changed, the relative motion parameter of the object to the reference point (viewer point) is calculated from the generated absolute motion parameter, and the time series of the relative coordinates of the object to the reference point (viewer point) is determined by the calculated relative motion parameter. Hence, the relative motion parameter is generated only when the pattern of the absolute motion is changed, so that the process may be free from waste.

Figure 32:
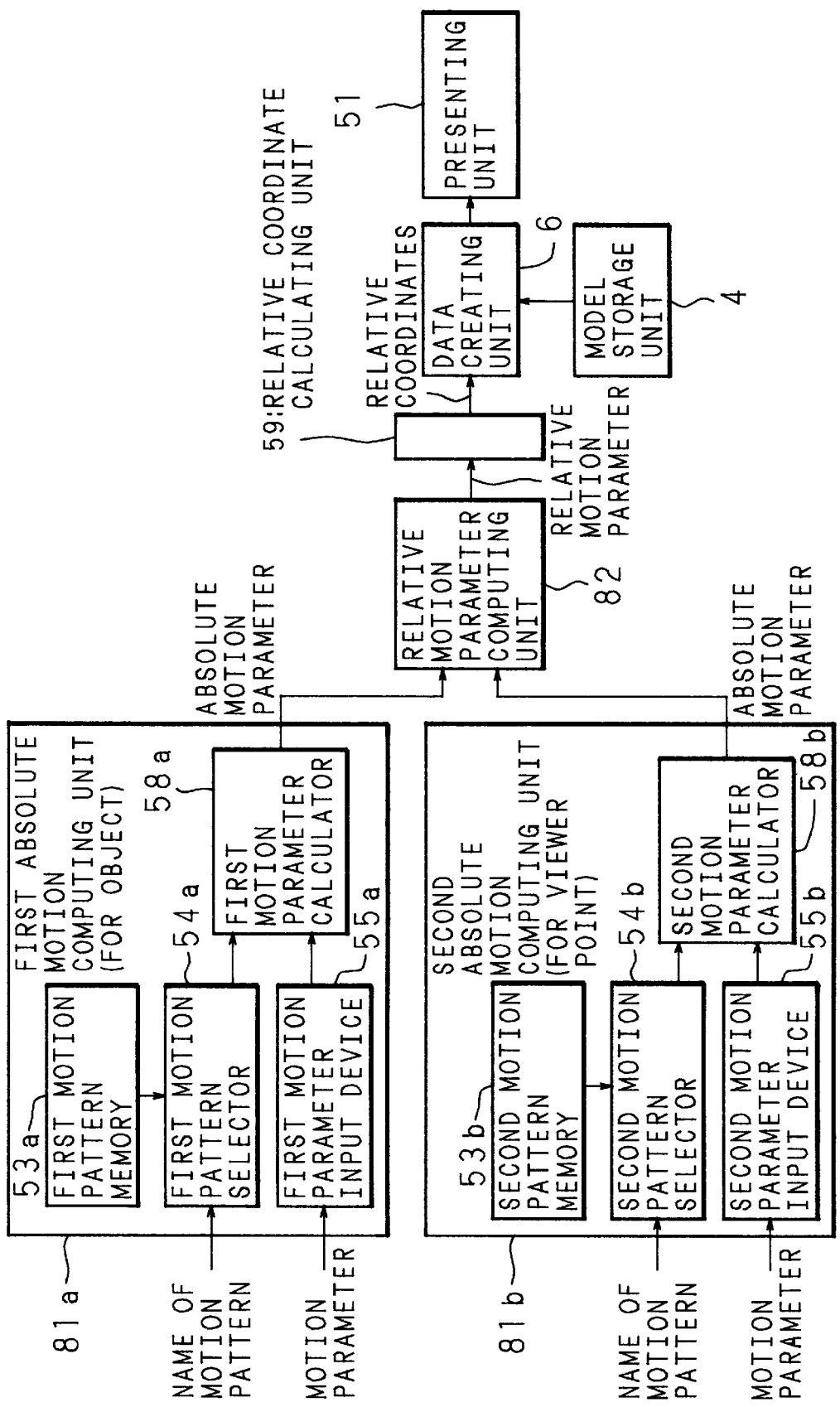
FIG. 32 is a block diagram of a twenty-second embodiment.

The attribute information presenting apparatus of the twenty-second embodiment of which constitution is shown in FIG. 32 has a model storage unit 4, a data creating unit 6, and a presenting unit 51 same as in FIG. 23, and also a first absolute motion computing unit 81a for determining and delivering an absolute motion parameter of the object every time the absolute motion command changes according to the inputted name of motion pattern of the object and the motion parameter, a second absolute motion computing unit 81b for determining and delivering an absolute motion parameter of the viewer point every time the absolute motion command changes according to the inputted name of motion pattern of the viewer point and the motion parameter, a relative motion parameter computing unit 82 for determining and delivering the relative motion parameter of the object to the viewer point from the outputs of the first absolute motion computing unit 81a and the second absolute motion computing unit 81b, and a relative coordinate calculating unit 59 for calculating the relative coordinates of the object to the viewer point from the inputted relative motion parameter.

The first absolute motion computing unit 81a has a first motion pattern memory 53a, a first motion pattern selector 54a and a first motion parameter input device 55a same as in FIG. 31, and also a first motion parameter calculator 55a for calculating the absolute motion parameter of the object on the basis of the outputs of the first motion pattern selector 54a and first motion parameter input device 55a, and delivering the absolute motion parameter of the object calculated upon every change thereof to the relative motion parameter computing unit 82. The second absolute motion computing unit 81b has a second motion pattern memory 53b, a second motion pattern selector 54b and a second motion parameter input device 55b same as in FIG. 31, and also a second motion parameter calculator 58b for calculating the absolute motion parameter of the viewer point on the basis of the outputs of the second motion pattern selector 54b and second motion parameter input device 55b, and delivering the absolute motion parameter of the viewer point calculated upon every change thereof to the relative motion parameter computing unit 82.

In the first motion parameter calculator 58a, the absolute motion parameter is delivered to the relative motion parameter computing unit 82 every time the absolute motion parameter of the object changes according to the motion pattern of the object entered from the first motion pattern selector 54a and the motion parameter of the object inputted from the first motion parameter input device 55a. In the second motion parameter calculator 58b, the absolute motion parameter is delivered to the relative motion parameter computing unit 82 every time the absolute motion parameter of the viewer point changes according to the motion pattern of the viewer point inputted from the second motion pattern selector 54b and the motion parameter of the viewer point inputted from the second motion parameter input device 55b. From the absolute motion parameters of the object and viewer point, the relative motion parameter of the object to the viewer point is determined in the relative motion parameter computing unit 82, and only when the relative motion parameter is changed, that is, only when the absolute motion parameter of at least either the object or the viewer point is changed, the relative motion parameter is delivered. In the relative coordinate calculating unit 59, the relative coordinates are calculated on the basis of the relative motion parameter, and delivered to the data creating unit 6. The subsequent operating process of the data creating unit 6, model storage unit 4, and presenting unit 51 is the same as that in the twentieth embodiment, and the description is omitted.

Outputs of the first and second motion parameter calculators 58a, 58b may be produced at every predetermined time. Alternatively, an FIFO buffer may be provided in the input unit of the relative motion parameter computing unit 82, the relative motion parameters delivered by the first and second motion parameter calculators 58a, 58b and the time information on the time required for the relative motion parameters to change are combined, and the relative motion parameter computing unit 82 may use the relative motion parameter at the beginning of the buffer according to the time information forming a pair therewith. Furthermore, same as in the example shown in FIG. 28, it may be also composed to additionally store new motion patterns in the first and second motion pattern memories 53a, 53b.

In the sixteenth to twenty-second embodiments, the effective time may be included in the relative motion parameter or the motion parameter. The effective time refers to the time for creating three-dimensional audio data, and when the motion of the object is known and the time when the sound of the object disappears is known, setting of such effective time is very meaningful. For example, such setting of effective time is utilized when the object departs far from the viewer point in a certain period time and the sound does not reach, or when the object is present only for a specific period of time.

Thus, according to the second aspect, for example, while the object is moving, even if the relative coordinates of the object to the viewer point may change together with the time, it is not necessary to calculate and feed the relative position at each time, and application into the system is easy.

The relative coordinates and absolute coordinates in the foregoing embodiments can be expressed in either system of orthogonal coordinates or system of polar coordinates.

The data of the attribute information is data of sound in the embodiments. But, as mentioned in the ninth and fifteenth embodiments, in other embodiments, too, the invention can be applied in exactly the same manner in the data of attribute information on other than sound, such as video data of an object expressing the shape and color of the object or the like.

The object and the viewer point are assumed to be present in the virtual space of the personal computer, but the invention may also be applied in the case in which the existing position of the user is the viewer point and a virtual object is present near the user.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An attribute information presenting apparatus for presenting audio or video information about an object at a reference point according to a relative distance and direction of the object to the reference point, the apparatus comprising:

storing means for storing audio or video information about the object, wherein the object is present at a plurality of relative positions and directions to the reference point;

input means for inputting relative coordinates of the object to the reference point; and reading means for reading audio or video information from the storing means according to the relative coordinates input by the input means.

2. An attribute information presenting apparatus of claim 1, wherein said reading means sequentially reads out the corresponding attribute information according to the relative coordinates sequentially inputted in said input means.

3. An attribute information presenting apparatus of claim 1, further comprising:
   converting means for converting the inputted relative coordinates into relative coordinates which are closest to the inputted relative coordinates and in which the corresponding attribute information is stored, when the attribute information on the object corresponding to the relative coordinates inputted in said input means is not stored in said storing means.

4. An attribute information presenting apparatus of claim 1, further comprising:
   interpolating means for interpolating plural pieces of attribute information corresponding to plural pieces of relative coordinates which are near the inputted relative coordinates and in which the attribute information is stored, when the attribute information on the object corresponding to the relative coordinates inputted in said input means is not stored in said storing means.

5. An attribute information presenting apparatus of claim 1, further comprising:
   means for inputting absolute coordinates of the reference point and sight direction of observing the object from the reference point;
   means for inputting absolute coordinates of the object; and
   means for calculating relative coordinates of the object to the reference point on the basis of the absolute coordinates of the reference point, sight direction, and absolute coordinates of the object.

6. An attribute information presenting apparatus of claim 1, wherein said input means, storing means, and reading means are provided independently in plural objects, and means for integrating the attribute information being read out by said reading means of each object is further provided.

7. An attribute information presenting apparatus of claim 1, further comprising:
   means for obtaining attribute information to be stored in said storing means, by locating the object at plural relative positions to the reference point.

8. An attribute information presenting apparatus of claim 1, wherein the attribute information on the object is three-dimensional audio data emitted by the object.

9. An attribute information presenting apparatus of claim 1, further comprising:
   means for assigning arbitrary relative coordinates of the object to the reference point; and
   calculating means for calculating the attribute information on the object corresponding to the assigned relative coordinates.

10. An attribute information presenting apparatus of claim 9, wherein said calculating means has plural calculating units differing in the calculating method, and means for selecting one calculating unit from the plural calculating units on the basis of the assigned relative coordinates is further provided.

11. An attribute information presenting apparatus for presenting audio or video information about an object at a reference point according to a relative position of the object to the reference point, the apparatus comprising:
   storing means for storing audio or video information about the object, wherein the object is present at a plurality of relative positions to the reference point;
   input means for inputting relative coordinates of the object to the reference point; reading means for reading audio or video information from the storing means according to the relative coordinates input by the input means; and
   means for determining weighted average of plural pieces of attribute information continuous in time being read out from said storing means.

12. An attribute information presenting apparatus for presenting audio or video information about an object at a reference point according to a relative position of the object to the reference point, the apparatus comprising:
   storing means for storing audio or video information about the object, wherein the object is present at a plurality of relative positions to the reference point;
   input means for inputting relative coordinates of the object to the reference point; reading means for reading audio or video information from the storing means according to the relative coordinates input by the input means; and
   means for determining weighted average of plural sets of relative coordinates continuous in time being inputted in said input means.

13. An attribute information presenting apparatus for presenting audio or video information about an object at a reference point according to a relative distance and direction of the object to the reference point, the apparatus comprising:
   storing mean for storing audio or video information about the object, wherein the object is present at a plurality of relative positions and directions to the reference point;
   input means for inputting relative coordinates of the object to the reference point;
   reading means for reading audio or video information from the storing means according to the relative coordinates input by the input means;
   converting means for converting the inputted relative coordinates into relative coordinates which are closest to the inputted relative coordinates and in which the corresponding attribute information is stored, when the attribute information on the object corresponding to the relative coordinates inputted in said input means is not stored in said storing means;
   interpolating means for interpolating plural pieces of attribute information corresponding to plural pieces of relative coordinates which are near the inputted relative coordinates and in which the attribute information is stored, when the attribute information on the object corresponding to the relative coordinates inputted in said input means is not stored in said storing means;
   means for comparing the relative distance of inputted relative coordinates and a predetermined value; and
   means for selecting said interpolating means when the relative distance is not more than the predetermined value, and selecting said converting means when the relative distance is more than the predetermined value.

14. An attribute information presenting apparatus for presenting audio or video information about an object at a reference point according to a relative distance and direction of the object to the reference point, the apparatus comprising:
   storing means for storing audio or video information about the object, wherein the object is present at a plurality of relative positions and directions to the reference point;
   input means for inputting relative coordinates of the object to the reference point;

reading means for reading audio or video information from the storing means according to the relative coordinates input by the input means;

means for comparing the relative distance of the relative coordinates input in said input means and a predetermined value; and means for stopping the reading operation of said reading means when the relative distance is not less than the predetermined value.

15. An attribute information presenting apparatus for presenting audio or video information about an object at a reference point according to a relative distance and direction of the object to the reference point, the apparatus comprising:

storing means for storing audio or video information about the object, wherein the object is present at a plurality of relative positions and directions to the reference point, wherein said storing means stores attribute information corresponding to the relative coordinates of which relative distance is not more than a predetermined value;

input means for inputting relative coordinates of the object to the reference point;

reading means for reading audio or video information from the storing means according to the relative coordinates input by the input means; and means for changing the magnitude of the attribute information stored in said storing means when the relative coordinates of which relative distance is larger than the predetermined value is inputted in said input means is further provided.

16. An attribute information presenting apparatus for presenting audio or video information about an object at a reference point according to a relative distance and direction of the object to the reference point, the apparatus comprising:

storing means for storing audio or video information about the object, wherein the object is present at a plurality of relative positions and directions to the reference point;

input means for inputting relative coordinates of the object to the reference point;

reading means for reading audio or video information from the storing means according to the relative coordinates input by the input means; and means for inverting the attribute information being read out by said reading means.

17. An attribute information presenting apparatus for presenting attribute information on an object to be presented at a reference point according to a relative distance and direction from the object to the reference point comprising:

relative coordinate preparing means for preparing a time series of relative coordinates of the object to the reference point by assigning the relative motion of the object to the reference point or each absolute motion of the object and reference point; and creating means for creating attribute information on the object according to the relative positions and directions to the object to the reference point on the basis of the prepared relative coordinates.

18. An attribute information presenting apparatus of claim 17, wherein the attribute information on the object is three-dimensional audio data emitted by the object.

19. An attribute information presenting apparatus of claim 17, wherein said relative coordinate preparing means comprises generating means for generating the relative coordinates on the basis of the data showing the type of relative motion and data showing the parameter of the relative motion.

20. An attribute information presenting apparatus of claim 19, wherein said generating means comprises memory means for storing motion pattern of plural types of relative motion, input means for inputting the parameter of motion pattern of relative motion, selecting means for selecting the motion pattern of relative motion, and means for generating the relative coordinates by applying the inputted parameter to the motion pattern being read out from said memory means on the basis of the selection by said selecting means.

21. An attribute information presenting apparatus of claim 19, wherein said generating means comprises memory means for storing motion pattern of plural types of relative motion, input means for inputting the parameter of motion pattern of relative motion, selecting means for selecting the motion pattern of relative motion, means for generating a time series of the relative motion parameters every time it changes by applying the inputted parameter to the motion pattern being read out from said memory means on the basis of the selection by said selecting means, and means for generating the relative coordinates on the basis of the generated relative motion parameter.

22. An attribute information presenting apparatus of claim 17, wherein said relative coordinate preparing means comprises generating means for generating the relative coordinates on the basis of the data showing the type of each absolute motion of the object and reference point and data showing the parameter of each absolute motion thereof.

23. An attribute information presenting apparatus of claim 22, wherein said generating means comprises first memory means for storing motion patterns of plural types of absolute motion for the object, first input means for inputting the parameter of motion pattern of absolute motion of the object, first selecting means for selecting the motion pattern of absolute motion of the object, first calculating means for calculating the absolute coordinates of the object by applying the inputted parameter to the motion pattern being read out from said first memory means on the basis of the selection by said first selecting means, second memory means for storing motion patterns of plural types of absolute motion for the reference point, second input means for inputting the parameter of motion pattern of absolute motion of the reference point, second selecting means for selecting the motion pattern of absolute motion of the reference point, second calculating means for calculating the absolute coordinates of the reference point by applying the inputted parameter to the motion pattern being read out from said second memory means on the basis of the selection by said second selecting means, and means for generating the relative coordinates from the both absolute coordinates calculated in said first and second calculating means.

24. An attribute information presenting apparatus of claim 22, wherein said generating means comprises first memory means for storing motion patterns of plural types of absolute motion for the object, first input means for inputting the parameter of motion pattern of absolute motion of the object, first selecting means for selecting the motion pattern of absolute motion of the object, first calculating means for calculating a time series of absolute motion parameters of the object every time it changes by applying the inputted parameter to the motion pattern being read out from said first memory means on the basis of the selection by said first selecting means, second memory means for storing motion patterns of plural types of absolute motion for the reference point, second input means for inputting the parameter of motion pattern of absolute motion of the reference point, second selecting means for selecting the motion pattern of absolute motion of the reference point, second calculating means for calculating a time series of absolute motion parameters of the reference point every time it changes by applying the inputted parameter to the motion pattern being read out from said second memory means on the basis of the selection by said second selecting means, third calculating means for calculating the relative motion parameter of the object to the reference point from the both absolute motion parameters calculated in said first and second calculating means, and means for generating the relative coordinates on the basis of the relative motion parameter calculated in said third calculating means.

25. A multimedia system for presenting attribute information for multimedia of an object to be presented at a viewer point according to a relative distance and direction of the object to the viewer point, comprising:

input means for inputting relative coordinates of the object representing distances and directions to the viewer point;

storing means for storing attribute information for multimedia of the object to be presented at the viewer point when the object is present at plural relative positions to the viewer point; and reading means for reading out the attribute information from said storing means according to the relative coordinates inputted in said input means.

26. A multimedia system for presenting attribute information for multimedia of an object to be presented at a viewer point according to a relative distance and direction from the object to the viewer point, comprising:

relative coordinate preparing means for preparing a time series of relative coordinates of the object to the viewer point by assigning the relative motion of the object to the viewer point or each absolute motion of the object and viewer point; and creating means for creating attribute information on the object according to the relative positions and directions to the object to the viewer point on the basis of the prepared relative coordinates.

* * * * *